(12) United States Patent
Wang et al.

(10) Patent No.: US 12,289,634 B2
(45) Date of Patent: Apr. 29, 2025

(54) DATA TRANSMISSION METHOD AND APPARATUS, FIRST COMMUNICATION NODE, AND SECOND COMMUNICATION NODE

(71) Applicant: ZTE Corporation, Guangdong (CN)

(72) Inventors: Mengzhen Wang, Guangdong (CN); Lin Chen, Guangdong (CN)

(73) Assignee: ZTE Corporation, Shenzhen (CN)

( * ) Notice: Subject to any disclaimer, the term of this patent is extended or adjusted under 35 U.S.C. 154(b) by 657 days.

(21) Appl. No.: 17/626,478

(22) PCT Filed: May 28, 2020

(86) PCT No.: PCT/CN2020/092777
§ 371 (c)(1),
(2) Date: May 18, 2022

(87) PCT Pub. No.: WO2021/004182
PCT Pub. Date: Jan. 14, 2021

(65) Prior Publication Data
US 2022/0286896 A1 Sep. 8, 2022

(30) Foreign Application Priority Data
Jul. 11, 2019 (CN) .......................... 201910626012.8

(51) Int. Cl.
*H04W 28/02* (2009.01)
*H04W 92/18* (2009.01)

(52) U.S. Cl.
CPC ... *H04W 28/0263* (2013.01); *H04W 28/0268* (2013.01); *H04W 28/0273* (2013.01); *H04W 92/18* (2013.01)

(58) Field of Classification Search
CPC ......... H04W 28/0263; H04W 28/0268; H04W 28/0273; H04W 92/18; H04W 76/23;
(Continued)

(56) References Cited

U.S. PATENT DOCUMENTS 12,004,002 B2 * 6/2024 Fiorani ............. H04W 36/0044
2022/0201538 A1 * 6/2022 Lee ................... H04W 28/0268
2022/0225156 A1 * 7/2022 Lee ....................... H04W 28/02

FOREIGN PATENT DOCUMENTS

CN 107770807 A 3/2018
CN 108401479 A 8/2018
(Continued)

OTHER PUBLICATIONS

International Search Report mailed Aug. 27, 2020 in connection with International Application No. PCT/CN2020/092777.
(Continued)

*Primary Examiner* — Habte Mered
(74) *Attorney, Agent, or Firm* — Wolf, Greenfield & Sacks, P.C.

(57) ABSTRACT

Provided are a data transmission method and apparatus, a first communication node, and a second communication node. The data transmission method includes: determining remapping configuration information, where the remapping configuration information indicates a PC5 quality of service (QOS) flow in which re-mapping is occurred, a source sidelink radio bearer, SLRB, corresponding to the PC5 QoS flow in which re-mapping is occurred, and a target SLRB corresponding to the PC5 QoS flow in which re-mapping is occurred; and sending the remapping configuration information to a second communication node.

20 Claims, 5 Drawing Sheets

(58) Field of Classification Search
CPC ......... H04W 4/06; H04W 4/40; H04W 76/14; H04W 88/02
See application file for complete search history.

(56) References Cited

FOREIGN PATENT DOCUMENTS

| | | | |
|---|---|---|---|
| CN | 109379784 A | 2/2019 |
| CN | 109526026 A | 3/2019 |
| CN | 109548085 A | 3/2019 |
| CN | 109952773 A | 6/2019 |
| CN | 110536263 A | 12/2019 |
| KR | 10-2013-0093573 A | 8/2013 |
| WO | WO 2017/197649 A1 | 11/2017 |
| WO | WO 2019/028896 A1 | 2/2019 |

OTHER PUBLICATIONS

[No Author Listed], Qos Flow remapping and end marker. 3GPP TSG-RAN WG2 #101bis Tdoc R2-1805507. Ericsson. Apr. 16-20, 2018. 5 pages.

[No Author Listed], Resource selection in CA-based eV2x. 3GPP TSG-RAN2 Meeting #99. R2-1707701. Oppo. Aug. 21-25, 2017. 4 pages.

Chinese Search Report dated Apr. 30, 2024, in connection with Chinese Application No. 201910626012.8, and English translation thereof.

Chinese Office Action dated May 6, 2024, in connection with Chinese Application No. 201910626012.8, and English translation thereof.

Extended European Search Report dated Jul. 7, 2023, in connection with European Application No. 20836377.0-1218.

Huawei, Summary of email discussion [104#58] [NR V2X]—QoS support for NR V2X. 3GPP TSG-RAN WG2 Meeting #105. Feb. 15, 2019. 57 pages.

Japanese Office Action dated Feb. 21, 2023, in connection with Japanese Application No. 2022-501310.

[No Author Listed], On NR sidelink radio bearer.3GPP TSG-RAN WG2 #104. R2-1817926. Ericsson. Nov. 12-16, 2018. 3 pages.

[No Author Listed], SLRB Configuratoin Procedure based on the QoS Framework. 3 Gpp TSG-RAN WG2 Meeting #105bis.R2-1903174. CATT. May 13-17, 2019. 8 pages.

Korean Office Action dated Jul. 30, 2024, in connection with Korean Application No. 10-2022-7004553, with English translation thereof.

[No Author Listed], SDAP Sublayer for NR V2XSidelink. CATT. 3GPP TSG-RAN WG2 Meeting #105. R2-1900190. Feb. 25-Mar. 1, 2018. 3 Pages.

\* cited by examiner

DATA TRANSMISSION METHOD AND APPARATUS, FIRST COMMUNICATION NODE, AND SECOND COMMUNICATION NODE

CROSS-REFERENCES TO RELATED APPLICATIONS

This is a National Stage Application, filed under 35 U.S.C. 371, of International Patent Application No. PCT/CN2020/092777, filed on May 28, 2020, which is based on and claims priority to Chinese Patent Application No. 201910626012.8 filed with the China National Intellectual Property Administration (CNIPA) on Jul. 11, 2019, the disclosure of which is incorporated herein by reference in its entirety.

TECHNICAL FIELD

The present application relates to radio communication networks, for example, a data transmission method and apparatus, a first communication node, and a second communication node.

BACKGROUND

The vehicle to everything refers to a large system network for radio communication and information exchange between a vehicle and X (with the X including a vehicle, a pedestrian, an infrastructure, or the Internet) in accordance with an agreed communication protocol and a data interaction standard. V2X communication ensures the driving safety of the vehicle, improves transport efficiency, and provides convenience or entertainment information. According to objects involved in radio communication, V2X communication includes four different types: vehicle-to-vehicle (V2V) communication, vehicle-to-infrastructure (V2I) communication, vehicle-to-network (V2N) communication, and vehicle-to-pedestrian (V2P) communication, which are collectively referred to as V2X communication.

In the research of V2X communication based on the long term evolution (LTE) of the 3rd Generation Partnership Project (3GPP), the V2X communication method based on a sidelink (SL) between user equipments (UE) is one of the manners implementing the V2X standard. That is, service data is directly transmitted from a source user equipment to a target user equipment through an air interface without being forwarded by a base station and a core network.

With the progress in communication technology and the development in the automation industry, a V2X communication scenario is further extended and has higher performance requirements. The 3GPP has approved the research of advanced V2X services in vehicle-to-everything communication based on the fifth generation mobile communication technology (5G, or 5th Generation) including the vehicle-to-everything communication based on a 5G air interface and the vehicle-to-everything communication based on a 5G sidelink. However, in the vehicle-to-everything communication based on a 5G sidelink, a technical problem that a receiving end performs out-of-order delivery to the upper layer emerges.

SUMMARY

The present application provides a data transmission method and apparatus, a first communication node, and a second communication node to solve the technical problem that a receiving end performs out-of-order delivery to the upper layer.

Embodiments of the present application provide a data transmission method. The method is applied to a first communication node and includes the following.

Remapping configuration information is determined. The remapping configuration information indicates a PC5 quality of service (QoS) flow in which re-mapping is occurred, a source sidelink radio bearer (SLRB) corresponding to the PC5 QoS flow in which re-mapping is occurred, and a target SLRB corresponding to the PC5 QoS flow in which re-mapping is occurred.

The remapping configuration information is sent to a second communication node.

Embodiments of the present application provide a data transmission method. The method is applied to a second communication node and includes the following.

The remapping configuration information sent by a first communication node is received.

A PC5 QoS flow in which re-mapping is occurred, a corresponding source SLRB, and a target SLRB corresponding to the PC5 QoS flow in which re-mapping is occurred are determined based on the remapping configuration information.

In the case where the data on the source SLRB and of the PC5 QoS flow in which re-mapping is occurred is transmitted completely, the data on the target SLRB and of the PC5 QoS flow in which re-mapping is occurred is transmitted.

Embodiments of the present application provide a data transmission device. The data transmission device is arranged in a first communication node and includes a determination module and a sending module.

The determination module is configured to determine remapping configuration information. The remapping configuration information indicates a PC5 QoS flow in which re-mapping is occurred, a source sidelink radio bearer (SLRB) corresponding to the PC5 QoS flow in which re-mapping is occurred, and a target SLRB corresponding to the PC5 QoS flow in which re-mapping is occurred.

The sending module is configured to send the remapping configuration information to a second communication node.

Embodiments of the present application provide a data transmission device. The data transmission device is arranged in a second communication node and includes a receiving module and a determination module.

The receiving module is configured to receive the remapping configuration information sent by a first communication node.

The determination module is configured to determine a PC5 QoS flow in which re-mapping is occurred, a corresponding source SLRB, and a target SLRB corresponding to the PC5 QoS flow in which re-mapping is occurred based on the remapping configuration information.

The transmission module is configured to, in the case where the data on the source SLRB and of the PC5 QoS flow is transmitted completely, transmit the data on the target SLRB and of the PC5 QoS flow.

Embodiments of the present application provide a first communication node. The first communication node includes processors and a storage apparatus configured to store programs.

When executed by the processors, the programs cause the processors to perform a data transmission method.

Embodiments of the present application provide a second communication node. The second communication node includes processors and a storage apparatus configured to store programs.

When executed by the processors, the programs cause the processors to perform a data transmission method.

Embodiments of the present application provide a storage medium for storing a computer program which, when executed by a processor, causes the processor to perform any method in embodiments of the present application.

DETAILED DESCRIPTION

Embodiments of the present application are described hereinafter in detail in conjunction with the drawings. It is to be noted that if not in collision, embodiments of the present application and features therein may be combined with each other in any manner.

Figure 1:
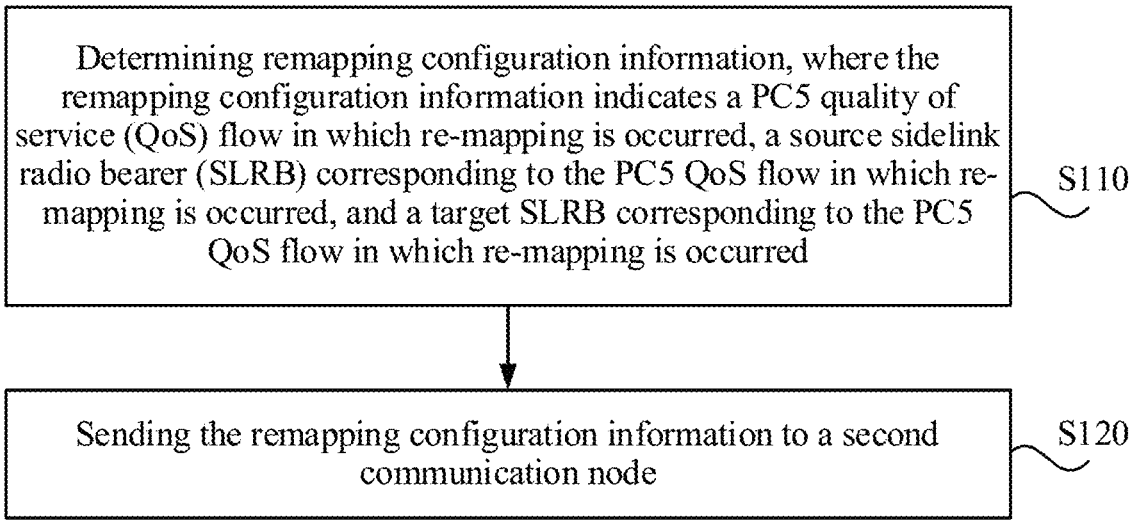
FIG. 1 is a flowchart of a data transmission method according to the present application.

In an exemplary embodiment, FIG. 1 is a flowchart of a data transmission method according to the present application. The method may be applied to the case where a receiving end performs in-order delivery to the upper layer when a sidelink interface quality of service flow, that is, a PC5 QoS flow is remapped. This method may be performed by a data transmission apparatus provided in the present application. The data transmission apparatus may be implemented by software and/or hardware and integrated into a first communication node. The first communication node may be a sending end.

Figure 2:
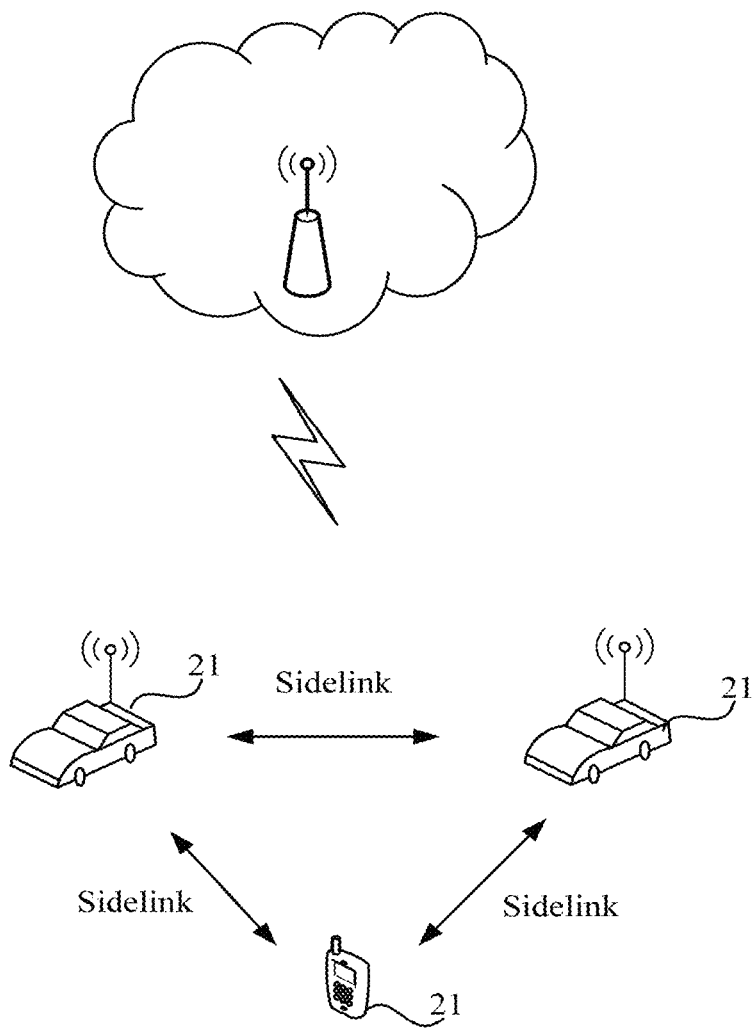
FIG. 2 is a scenario view of a V2X communication manner.

The scenario of this example is V2X communication based on a sidelink between user equipments. That is, service data is directly transmitted from a source user equipment to a target user equipment through an air interface. FIG. 2 is a scenario view of a V2X communication manner.

Referring to FIG. 2, service data may be transmitted directly between user equipments 21 without being forwarded by a base station and a core network. The V2X communication manner is short for sidelink interface communication based on V2X (that is, PC5-based V2X) or V2X sidelink (SL) communication.

Technical terms included in the present application include but are not limited to logical channel (LCH), sidelink interface (PC5), packet delay budget (PDB), access stratum (AS), 5G quality of service identifier (5G QoS identifier or 5QI), QoS flow identifier (QFI), sidelink interface quality of service flow identifier (PC5 QoS flow identifier or PFI), Service Data Adaptation Protocol (SDAP), access and mobility management function (AMF), 5QI on the PC5 interface (PC5 5QI, or PQI), sidelink radio bearer (SLRB), logical channel prioritization (LCP), media access control-control element (MAC-CE), unacknowledged mode (UM) and acknowledged mode (AM), packet data unit (PDU) and signaling radio bearer (SRB), radio resource control (RRC), Packet Data Convergence Protocol (PDCP), Packet Data Convergence Protocol sequence number (PDCP SN), service data unit (SDU), packet data unit (PDU), guaranteed flow bit rate (GFBR), aggregate maximum bit rate (AMBR), maximum flow bit rate (MFBR), guaranteed bit rate (GBR), non-guaranteed bit rate (non-GBR), sidelink unicast identifier (PC5 link identifier or PLI).

A per flow-based quality of service (QoS) model is supported in V2X sidelink communication based on the new radio (NR). Specifically, a V2X packet is mapped to a sidelink interface quality of service flow (PC5 QoS flow). Then the PC5 QoS flow is mapped to a sidelink radio bearer (SLRB) for transmission. When the PC5 QoS flow is remapped, the problem that a receiving end performs out-of-order delivery to the upper layer may be caused. Accordingly, when the PC5 QoS flow is remapped, the problem that a receiving end performs out-of-order delivery to the upper layer is urgent to solve.

The per flow-based QoS model is supported in the V2X sidelink communication based on the NR. Specifically, a V2X data packet is mapped to a PC5 QoS flow. Then the PC5 QoS flow is mapped to a sidelink radio bear for transmission. When the PC5 QoS flow is remapped, the problem that a receiving end performs out-of-order delivery to the upper layer may be caused. The present application provides a solution of ensuring that a receiving end performs in-order delivery to the upper layer when a PC5 QoS flow is remapped. Additionally, when needing to perform sidelink communication, a UE in the connected state needs to report the information of a to-be-transmitted service and request a sidelink resource. The present application provides a specific triggering condition and related timing sequence process of sidelink user equipment information (sidelinkUEInformation).

Specifically, after a PC5 QoS flow is originally mapped to an SLRB1 for transmission, the PC5 QoS flow may be remapped to an SLRB2 for transmission, that is, PC5 QoS flow remapping occurs. The SLRB2 and the SLRB1 belong to the sidelink bearer with the same source and target identifiers. For example, when a UE switches from the current base station to another base station, the new base station may reconfigure/update the mapping from the PC5 QoS flow to an SLRB based on the sidelink resource situations. Alternatively, the PC5 QoS flow is remapped to another SLRB from a default SLRB. When PC5 QoS flow remapping occurs, out-of-order delivery may be caused when the receiving-end UE transmits data to the upper layer. For example, when the UE receives the remapping configuration, some data of the QoS flow is buffered by a source SLRB and is not fully transmitted, and new data of the QoS flow arrives and should be transmitted through a new SLRB, that is, a target SLRB. The data buffered by the source SLRB may be not fully transmitted while the receiving end has received new data on the new SLRB and submitted the new data to the upper layer. A safeguard mechanism needs to be considered so as to guarantee in-order delivery to the upper layer.

In the case of a sidelink broadcast/multicast, it may be implemented only based on the receiving UE. For example, when the UE receives the PC5 QoS flow remapping configuration, the UE may start to transmit the data on the new SLRB and of the PC5 QoS flow only after the data of the PC5 QoS flow and buffered on the source SLRB is fully transmitted. However, this manner may destroy the LCP mechanism that needs to be followed by the UE.

In the case of a sidelink unicast, one manner is to be implemented by the UE, which is the same as a sidelink broadcast/multicast. However, this manner may destroy the LCP mechanism that needs to be abided by the UE and is not a standardized achievable implementation. Another solution is to indicate an end marker.

As shown in FIG. 1, the present application provides a data transmission method. The method is applied to a first communication node and includes S110 to S120.

In S110, remapping configuration information is determined. The remapping configuration information indicates a PC5 QoS flow in which re-mapping is occurred, a source sidelink radio bearer (SLRB) corresponding to the PC5 QoS flow in which re-mapping is occurred, and a target SLRB corresponding to the PC5 QoS flow in which re-mapping is occurred.

The remapping configuration information may be the information sent by a first communication node to a second communication node to indicate the PC5 QoS flow in which re-mapping is occurred. The PC5 QoS flow in which re-mapping is occurred may have the corresponding source SLRB and the corresponding target SLRB. The source SLRB refers to the SLRB to which the PC5 QoS flow in which re-mapping is occurred is originally mapped. The target SLRB refers to the SLRB to which the PC5 QoS flow is mapped after remapping.

When the remapping configuration information is determined, the remapping configuration information may be determined based on the configuration information sent by a base station. The first communication node may directly configure the configuration information as the remapping configuration information. Alternatively, the first communication node may determine the remapping configuration information after analyzing the configuration information.

The remapping configuration information may include: the PC5 QoS flow being released from the source SLRB and added to the target SLRB; or the PC5 QoS flow remapping indication, the identifier information of the source SLRB, and the identifier information of the target SLRB. S120, the remapping configuration information is sent to a second communication node.

After determining the remapping configuration information, the first communication node may send the remapping configuration information to the second communication node, so that the second communication node performs in-order delivery to the upper layer based on the remapping configuration information.

The means by which the first communication node sends the remapping configuration information is not limited. In one embodiment, the first communication node may send the remapping configuration information to the second communication node through a radio resource control message or a MAC-CE.

According to the data transmission method provided in the present application, remapping configuration information is determined, where the remapping configuration information indicates a PC5 QoS flow in which re-mapping is occurred, a source sidelink radio bearer (SLRB) corresponding to the PC5 QoS flow in which re-mapping is occurred, and a target SLRB corresponding to the PC5 QoS flow in which re-mapping is occurred; and the remapping configuration information is sent to a second communication node. It solves the technical problem that the second communication node performs out-of-order delivery to the upper layer, effectively guarantees that the second communication node performs in-order delivery to the upper layer, and enhances the reliability of data transmission.

On the basis of the preceding embodiment, variant embodiments of the preceding embodiment are proposed. It is to be noted here that for ease of description, only differences from the preceding embodiment are described in the variant embodiments.

In one embodiment, the remapping configuration information includes a modified mapping relationship between an SLRB and PC5 QoS flows.

The modified mapping relationship between an SLRB and PC5 QoS flow may be changes occurred in the mapping relationship between SLRBs and PC5 QoS flows relative to existing mapping relationships between SLRB and PC5 QoS flows. For example, the modified mapping relationship may include: an existing PC5 QoS flow mapped to an SLRB being deleted, and/or adding a mapping relationship between a new SLRB and a PC5 QoS flow being added, and/or a new PC5 QoS flow mapped to an SLRB being added.

In one embodiment, the remapping configuration information includes the identifier information of the PC5 QoS flow in which re-mapping is occurred, the identifier information of the corresponding source SLRB, and the identifier information of the corresponding target SLRB.

The remapping configuration information may include the identifier information of the PC5 QoS flow in which re-mapping is occurred, the identifier information of the source SLRB corresponding to the PC5 QoS flow in which re-mapping is occurred, and the identifier information of the target SLRB corresponding to the PC5 QoS flow in which re-mapping is occurred. The related information of the PC5 QoS flow in which re-mapping is occurred may be determined based on each identifier information.

In one embodiment, the identifier information of the sidelink interface quality of service flow in which re-mapping is occurred is a sidelink interface quality of service flow identifier, a 5G quality of service identifier on a sidelink interface, a sidelink interface quality of service parameter, or a sidelink interface quality of service configuration profile.

In one embodiment, the identifier information of the source SLRB is a source SLRB identifier or a logical channel identifier corresponding to the source SLRB. The identifier information of the target SLRB is a target SLRB identifier or a logical channel identifier corresponding to the target SLRB.

In one embodiment, sending the remapping configuration information to the second communication node includes: sending remapping configuration information to the second communication node through a sidelink radio resource control message; or sending the remapping configuration information to the second communication node through a sidelink media access control-control element.

When the remapping configuration information is sent through the SL MAC CE, the identifier information of the PC5 QoS flow in which re-mapping is occurred, the identifier information of the source SLRB, and the identifier information of the new SLRB are sent through the SL MAC CE to an opposite-end UE, that is, the second communication node, so that the second communication node performs in-order delivery to the upper layer.

Specifically, one manner in which the first communication node sends the remapping configuration information of the PC5 QoS flow to the second communication node is that whenever PC5 QoS flows mapped to a certain SLRB change (that is, the mapping from the PC5 QoS flows to the SLRB (that is, the PC5 QoS flow to SLRB mapping) changes, where the mapping sent by the base station is received by a UE), the UE sends the newly configured or updated mapping relationship between the PC5 QoS flows and the SLRB to the opposite-end UE (that is, the mapping relationship between the PC5 QoS flows and the SLRB is sent through the PC5 SLRB configuration information to the opposite-end UE; and the sending is performed through a PC5 RRC message, for example, a PC5 AS configuration message) either through adding, releasing or remapping. The opposite-end UE determines whether a certain PC5 QoS flow is remapped between one SLRB to another SLRB based on each mapping relationship between an SLRB and PC5 QoS flow and identifies a source SLRB of PC5 QoS flow remapping and a target SLRB of PC5 QoS flow remapping. For example, on a source SLRB, the mapping from PC5 QoS flow 1 to the source SLRB is released from the mapping relationships between PC5 QoS flows and SLRBs. Moreover, on a target SLRB, the mapping from PC5 QoS flow 1 to the target SLRB is added to the mapping relationships between PC5 QoS flows and SLRBs. After receiving the remapping configuration information of the QoS flow sent by the sending UE, the opposite-end UE determines whether to accept the remapping configuration information and send response/acknowledgment information to the sending UE, that is, the first communication node.

In another manner, the UE does not need to send each mapping relationship between an SLRB and PC5 QoS flows to the opposite-end UE. The UE sends the identifier information of the PC5 QoS flow in which re-mapping is occurred, the identifier information of the source SLRB, and the identifier information of the target SLRB through a PC5 RRC message, for example, a PC5 AS configuration message, to the opposite-end UE only when a certain PC5 QoS flow is remapped. The identifier information of the PC5 QoS flow is the PFI or the PQI or is identified by the corresponding PC5 QoS parameter/configuration profile. The identifier information of an SLRB is a sidelink bear identifier or a logical channel identifier corresponding to the SLRB. After receiving the remapping configuration information of the QoS flow sent by the sending UE, that is, the first communication node, the opposite-end UE determines whether to accept the remapping configuration information and send response/acknowledgment information to the sending UE.

Figure 3:
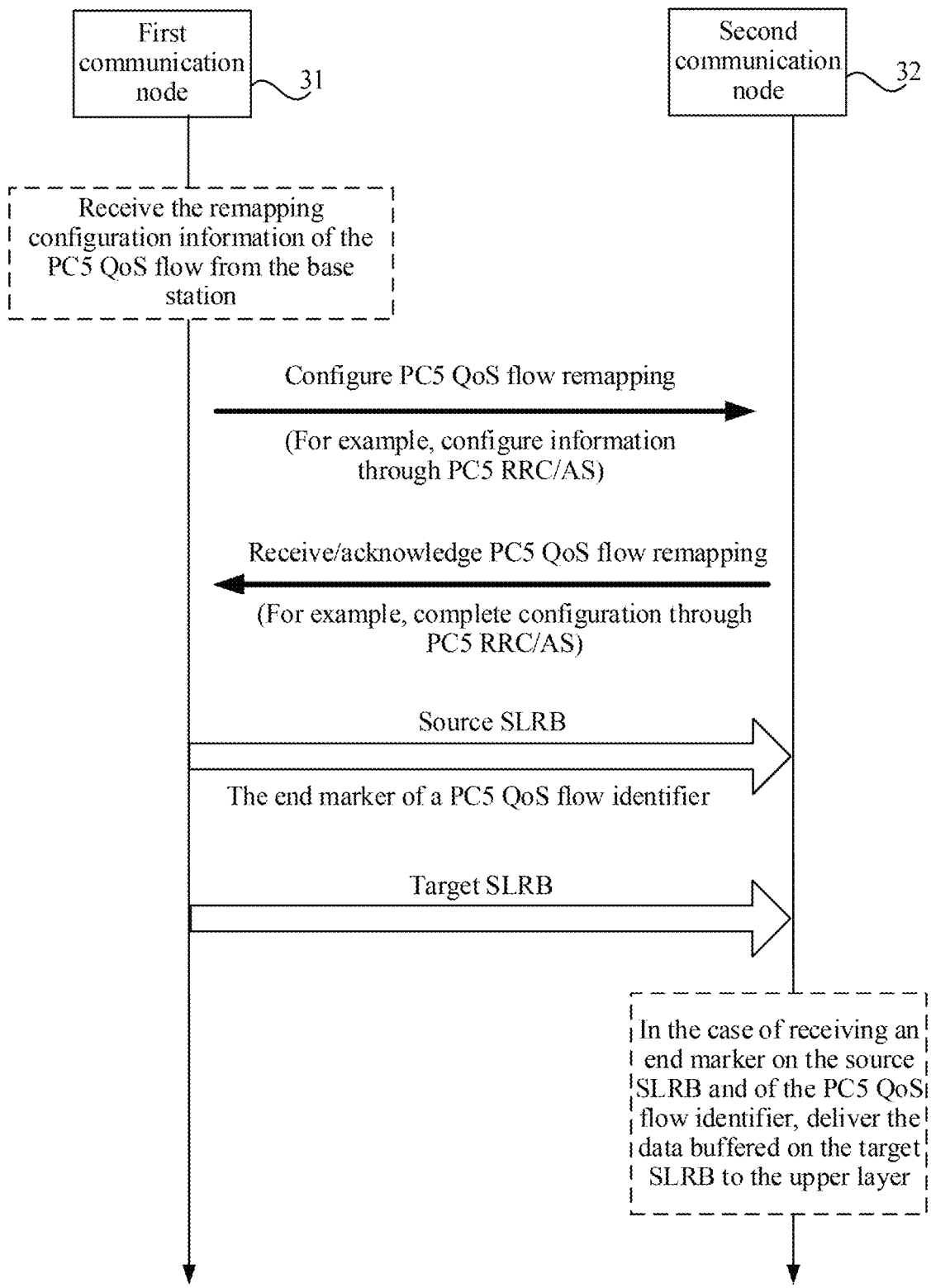
FIG. 3 is a diagram illustrating the interaction between communication nodes according to the present application.

FIG. 3 is a diagram illustrating the interaction between communication nodes according to the present application. Referring to FIG. 3, the interaction between communication nodes refers to that the first communication node 31 and the second communication node 32 perform data interaction. Specifically, the first communication node 31 receives the remapping configuration information of the PC5 QoS flow from the base station and then transmits the remapping configuration information of the PC5 QoS flow to the second communication node 32 so that remapping configuration is implemented. The second communication node 32 feeds back the reception/acknowledgment of PC5 QoS flow remapping to the first communication node. Moreover, the second communication node 32 delivers the data buffered on the target SLRB to the upper layer before receiving an end marker on the source SLRB and of the PC5 QoS flow identifier.

In another manner, the UE sends the identifier information of the PC5 QoS flow in which re-mapping is occurred, the identifier information of the source SLRB, and the identifier information of the target SLRB through an SL MAC CE to the opposite-end UE. Table 1 shows the MAC CE format.

TABLE 1

| MAC CE format | | |
|---|---|---|
| Sidelink interface quality of service flow identifier | Source sidelink bear (corresponding logical channel identifier) | Oct1 (8 bits) |
| Source sidelink bear (corresponding logical channel identifier) (continued) | Target sidelink bear (corresponding logical channel identifier) | Oct2 (8 bits) |
| Target sidelink bear (corresponding logical channel identifier) (continued) Reserved Reserved Reserved Reserved Reserved Reserved | | Oct3 (8 bits) |

Referring to Table 1, the sidelink interface quality of service flow identifier is also referred to as the PFI. The source sidelink bearer is the original SLRB. The logical channel identifier is also referred to as the LC ID. The target sidelink bearer is the new SLRB. The source sidelink bear (or the corresponding logical channel identifier) is also referred to as the original SLRB (LC ID) cont. The PFI has 6 bits. The source SLRB (or the corresponding logical channel identifier) or the target SLRB (or the corresponding logical channel identifier) has 6 bits, which is not limited here. The MAC CE is formed by the count of bits of each identifier finally determined according to a standard so as to guarantee the alignment of MAC CE bytes. The remaining bits are reserved bits. In one embodiment, the method further includes: receiving the configuration information sent by the base station. The configuration information includes a modified mapping relationship between an SLRB and PC5 QoS flows. Alternatively, the configuration information includes the identifier information of the PC5 QoS flow in which re-mapping is occurred, the identifier information of the corresponding source SLRB, and the identifier information of the corresponding target SLRB. The configuration information may be the information that is sent by the base station to the first communication node and is used for performing PC5 QoS flow remapping configuration. The configuration information may be directly taken as the remapping configuration information. Alternatively, in the case where the configuration information includes a modified mapping relationship between an SLRB and PC5 QoS flows, the identifier information of the PC5 QoS flow in which re-mapping is occurred, the identifier information of the corresponding source SLRB, and the identifier information of the corresponding target SLRB are determined and configured as the remapping configuration information.

In one embodiment, the modified mapping relationship between an SLRB and PC5 QoS flows includes one of the following: at least one PC5 QoS flow being deleted from the existing PC5 QoS flows that are mapped to the SLRB; a mapping relationship between a new SLRB and PC5 QoS flows being added; or at least one new PC5 QoS flow mapped to the SLRB being added in the existing mapping relationship between the SLRB and the PC5 QoS flows.

The modified mapping relationship between an SLRB and PC5 QoS flows may include: a PC5 QoS flow being deleted from the mapping relationship with the source SLRB and being added to the mapping relationship with the target SLRB.

Specifically, the UE receives the PC5 QoS flow remapping configuration, that is, the configuration information, sent by the base station. The PC5 QoS flow remapping configuration sent by the base station may include: the PC5 QoS flow being released from the source SLRB and added to the target SLRB; or the PC5 QoS flow remapping indication, the identifier of the original SLRB, and the identifier of the new SLRB. The PC5 QoS flow may be identified through a PFI, a PQI, or a corresponding PC5 QoS parameter/configuration profile. The PC5 QoS parameter/configuration profile includes at least one of: a PQI, the GFBR and MFBR of a GBR QoS flow, the PC5 link AMBR of a non-GBR QoS flow, or a communication range.

In one embodiment, the method further includes the following.

In the case where the data on the source SLRB and of the PC5 QoS flow in which re-mapping is occurred is transmitted completely, on the source SLRB, an end marker is sent to the second communication node. The end marker indicates that the data on the source SLRB and of the PC5 QoS flow in which re-mapping is occurred is transmitted completely.

The first communication node may send the end marker to the second communication node to indicate the second communication node to report the data of the PC5 QoS flow in which re-mapping is occurred, where the data is buffered on the target SLRB.

In one embodiment, the end marker is a control-type Service Data Adaptation Protocol protocol data unit. The Service Data Adaptation Protocol protocol data unit includes a control-type indication of the Service Data Adaptation Protocol protocol data unit and a corresponding PC5 QoS flow identifier. Alternatively, the Service Data Adaptation Protocol protocol data unit includes the control-type indication of the Service Data Adaptation Protocol protocol data unit. Specifically, the UE sends the end marker (that is, the assembled end-marker SDAP PDU) and maps the PC5 QoS flow to the source SLRB for transmission.

If multiple PC5 QoS flows are mapped to each SLRB (that is, in the case of many-to-one PC5 QoS flow to SLRB mapping), at least the SDAP PDU on the source SLRB and target SLRB corresponding to the PC5 QoS flow in which re-mapping is occurred needs to include an SDAP header. The SDAP header includes the SDAP PDU type indication and the PC5 QoS flow identifier (PFI) corresponding to the SDAP SDU/PDU. The SDAP PDU type indication is 1 bit. The PFI may have 6 bits or other integer bits less than 8 bits. The type of an SDAP PDU includes a control PDU and a data PDU. A control PDU is an end-marker SDAP PDU indicating the end marker, which indicates that the sending of the data corresponding to the PFI mapped to the SLRB is ended. A control PDU only includes an SDAP header and does not include other payloads. A data PDU indicates detailed data payloads and the PFI to which the SDAP SDU mapped to the SLRB belongs and that is. Table 2 shows a control SDAP PDU (that is, end-marker SDAP PDU) format.

TABLE 2

| A control SDAP PDU (or end-marker SDAP PDU) format | | | |
|---|---|---|---|
| Protocol data unit type (Control) | Reserved | Sidelink interface quality of service flow identifier (For example, 6 bits) | Oct1 (8 bits) |

As shown in FIG. 2, "Reserved" (R) denotes a reserved bit. After the data buffered on the source SLRB and of the PC5 QoS flow (remapped to another/the target SLRB) is sent completely, the end marker (that is, the control SDAP PDU/end-marker SDAP PDU) is sent.

If only one PC5 QoS flow is mapped to each SLRB (that is, in the case of one-to-one PC5 QoS flow to SLRB mapping), the SDAP PDU does not include the PFI information enabling the receiving UE to identify the data of different PC5 QoS flows. The end marker may be indicated through the type of the 1-bit SDAP PDU. Table 3 shows another control SDAP PDU (that is, end-marker SDAP PDU) format.

TABLE 3

| Another control SDAP PDU (or end-marker SDAP PDU) format | | | | | | | |
|---|---|---|---|---|---|---|---|
| Protocol data unit type (Control) | Reserved | Reserved | Reserved | Reserved | Reserved | Reserved | Oct1 (8 bits) |

Table 3 shows another control SDAP PDU (or end-marker SDAP PDU) format. "Reserved" (R) denotes a reserved bit. In this manner, after the data buffered on the source SLRB and of the PC5 QoS flow (remapped to another/the target SLRB) is sent completely, the end marker (that is, the control SDAP PDU/end-marker SDAP PDU) is sent so that the receiving UE timely learns that the data on the original SLRB is sent completely, reducing the waiting/processing delay of the receiving UE. However, this manner causes a certain waste of resources. In another manner, the sending UE does not need to send any indication information, and the receiving UE implements in-order delivery of data packets to the upper layer.

If the receiving UE receives the data on the target SLRB and of the QoS flow before receiving the end marker on the source SLRB and of the QFI, the receiving UE buffers the data temporarily (for example, on the PDCP buffer) and does not deliver the data to the upper layer first. When receiving the end marker (that is, the control/end-marker SDAP PDU) on the source SLRB and of the QFI, the receiving UE delivers the temporarily buffered data on the target SLRB and of the OFI to the upper layer so as to guarantee in-order delivery of data packets to the upper layer.

If only one PC5 QoS flow is mapped to each SLRB (and if the receiving UE does not receive the end marker on the source SLRB and of the QFI (PC5 QoS flow)), before the source SLRB does not receive a data packet corresponding to the latest PDCP SN (latest PDCP SN+1) and a corresponding PDCT reordering timer expires, the receiving UE, when receiving the data on the target SLRB and of the PC5 QoS flow, temporarily buffers the data (on the PDCP buffer) and does not deliver the data to the upper layer first. When the source SLRB does not receive the latest PDCP SN (latest PDCP SN+1) and a corresponding PDCT reordering timer expires, the receiving UE delivers the temporarily buffered data on the target SLRB and of the PC5 QoS flow to the upper layer so as to guarantee in-order delivery of data packets to the upper layer.

In one embodiment, the method further includes the following.

SLRB configuration information is sent to the second communication node.

The SLRB configuration information may be the information that is sent by the first communication node to the second communication node and is used for configuring an SLRB on the second communication node. The SLRB configuration information includes a parameter needing to be consistent with the second communication node. Alternatively, the SLRB configuration information includes a parameter needing to be consistent with the second communication node and a parameter only used by the second communication node. Alternatively, the SLRB configuration information includes a parameter needing to be consistent with the second communication node and a mapping relationship between PC5 QoS flows and an SLRB. In one embodiment, the SLRB configuration information includes a mapping relationship between PC5 QoS flows and an SLRB.

In one embodiment, the SLRB configuration information includes at least one of: a reordering timer parameter, out-of-order delivery indication, a reassembly timer parameter, or a status prohibition timer parameter.

Specifically, as for sidelink unicast communication, part of the SLRB configuration parameters of the receiving UE is configured by the sending UE for the receiving UE. The sending UE may be the first communication node, and the receiving UE may be the second communication node. In one manner, the sending UE sends a parameter needing to be consistent with the UEs (the sending UE and the receiving UE) needing unicast communication to the receiving UE. A parameter only used by the receiving end is implemented by the receiving UE. The parameter needing to be consistent with the UEs needing unicast communication includes at least one of: a PDCP SN size, a header compression segment (header compression paras(maxCID, rohc profiles)), an acknowledged mode sequence number field length (sn-FieldLengthAM), an unacknowledged mode sequence number field length (sn-FieldLengthUM), or a downlink logical link identity (LCH id).

In another manner, the sending UE sends a parameter needing to be consistent with the UEs needing unicast communication and a parameter only used by the receiving end to the receiving UE. The receiving UE performs SLRB receiving parameter configuration based on the configuration of the sending UE. The parameter only used by the receiving end includes at least one of: a reordering timer (t-Reordering) parameter, out-of-order delivery (outOfOrderDelivery) indication, a reassembly timer (t-Reassembly) parameter, or a status prohibition timer (t-statusprohibit (for RLC AM)) parameter. Here outOfOrderDeliver indicates whether the receiving UE can deliver data packets to the upper layer out of order. If so, the PDCP of the receiving UE does not need to perform the reordering function. A reordering timer is also referred to as a t-Reordering. A reassembly timer is also referred to as a t-Reassembly.

In another manner, the sending UE sends a parameter needing to be consistent with the UEs needing unicast communication and a mapping relationship between PC5 QoS flows and an SLRB to the receiving UE. The receiving UE combines PC5 information, that is, a PC5 QoS parameter corresponding to a PC5 QoS flow obtained in a signaling message, to perform SLRB receiving parameter configuration.

Figure 4:
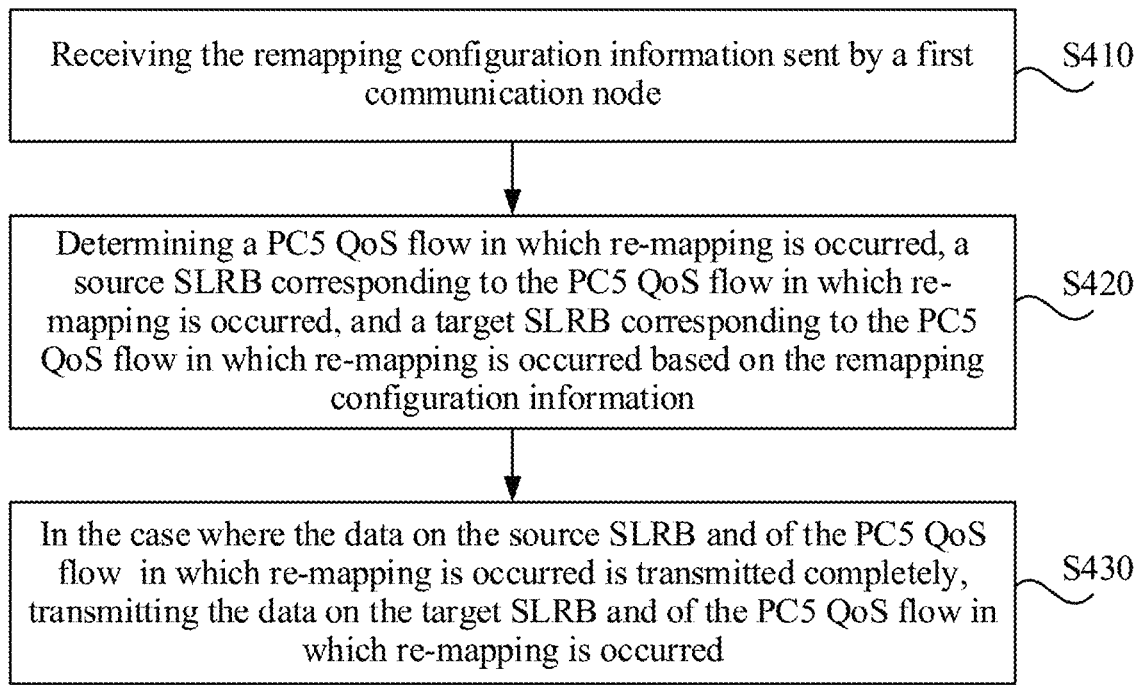
FIG. 4 is a flowchart of another data transmission method according to the present application.

In one embodiment, the method further includes: receiving the SLRB configuration information sent by the base station. The SLRB configuration information sent by the base station includes a sidelink unicast identifier associated with an SLRB or a target layer 2 identifier index associated with an SLRB. The target layer 2 identifier index associated with an SLRB is an index number serialized based on the entry sequence of a target layer 2 identifier in sidelink user information. In one exemplary embodiment, the present application further provides a data transmission method. FIG. 4 is a flowchart of another data transmission method according to the present application. The method may be applied to the case where a receiving end performs in-order delivery to the upper layer when a sidelink interface quality of service flow, that is, a PC5 QoS flow is remapped. This method may be performed by a data transmission apparatus provided in the present application. The data transmission apparatus may be implemented by software and/or hardware and integrated into a second communication node. The second communication node may be a receiving end.

As shown in FIG. 4, the data transmission method provided by the present application includes S410 to S430.

In S410, the remapping configuration information sent by a first communication node is received. The remapping configuration information may be used for indicating, to the first communication node, a PC5 QoS flow in which re-mapping is occurred. Based on the remapping configuration information, the first communication node determines the PC5 QoS flow in which re-mapping is occurred, guaranteeing in-order delivery of the data of the PC5 QoS flow.

In S420, a PC5 QoS flow in which re-mapping is occurred, a corresponding source SLRB corresponding to the PC5 QoS flow in which re-mapping is occurred, and a target SLRB corresponding to the PC5 QoS flow in which re-mapping is occurred are determined based on the remapping configuration information.

In the case where the remapping configuration information includes a modified mapping relationship between an SLRB and PC5 QoS flows, the modified mapping relationship between the SLRB and the PC5 QoS flows may be traversed to determine the PC5 QoS flow in which re-mapping is occurred. Then the source SLRB and target SLRB of the PC5 QoS flow in which re-mapping is occurred are identified and determined.

The PC5 QoS flow in which re-mapping is occurred, the source SLRB, and the target SLRB can be determined based on each identifier information in the case where the remapping configuration information includes the identifier information of the PC5 QoS flow in which re-mapping is occurred, the identifier information of the corresponding source SLRB, and the identifier information of the corresponding target SLRB.

In S430, in the case where the data on the source SLRB and of the PC5 QoS flow in which re-mapping is occurred is transmitted completely, the data on the target SLRB and of the PC5 QoS flow in which re-mapping is occurred is transmitted.

In the case where the PC5 QoS flow in which re-mapping is occurred, the source SLRB corresponding to the PC5 QoS flow in which re-mapping is occurred, and the target SLRB corresponding to the PC5 QoS flow in which re-mapping is occurred are determined, the data on the target SLRB and of the PC5 QoS flow may be transmitted in the case where on the SLRB corresponding to the PC5 QoS flow in which re-mapping is occurred, the data of the PC5 QoS flow is transmitted completely. Accordingly, in-order delivery is implemented.

The complete transmission of the data on the SLRB and of the PC5 QoS flow may be determined by the second communication node or may be determined based on the end marker of the transmission of the first communication node.

For the content that is not yet exhaustive in this embodiment, reference may be made to the preceding embodiments, which is not repeated here.

According to the data transmission method provided in the present application, the remapping configuration information sent by a first communication node is received; a PC5 QoS flow in which re-mapping is occurred, a source SLRB corresponding to the PC5 QoS flow in which re-mapping is occurred, and a target SLRB corresponding to the PC5 QoS flow in which re-mapping is occurred are determined based on the remapping configuration information; and in the case where the data on the source SLRB and of the PC5 QoS flow in which re-mapping is occurred is transmitted completely, the data on the target SLRB and of the PC5 QoS flow in which re-mapping is occurred is transmitted. It solves the technical problem that the second communication node performs out-of-order delivery to the upper layer, effectively guarantees that the second communication node performs in-order delivery to the upper layer, and enhances the reliability of data transmission.

On the basis of the preceding embodiment, variant embodiments of the preceding embodiment are proposed. It is to be noted here that for ease of description, only differences from the preceding embodiment are described in the variant embodiments.

In one embodiment, the remapping configuration information includes a modified mapping relationship between an SLRB and PC5 QoS flows.

In one embodiment, the modified mapping relationship between an SLRB and PC5 QoS flows includes: at least one PC5 QoS flow being deleted from the existing PC5 QoS flows that are mapped to the SLRB; a mapping relationship between a new SLRB and PC5 QoS flows being added; or at least one new PC5 QoS flow mapped to the SLRB being added in the existing mapping relationship between the SLRB and the PC5 QoS flows.

In one embodiment, the remapping configuration information includes the identifier information of the PC5 QoS flow in which re-mapping is occurred, the identifier information of the source SLRB corresponding to the PC5 QoS flow in which re-mapping is occurred, and the identifier information of the target SLRB corresponding to the PC5 QoS flow in which re-mapping is occurred.

In one embodiment, the identifier information of the PC5 QoS flow in which re-mapping is occurred is a PC5 QoS flow identifier, a 5G quality of service identifier on a sidelink interface, a PC5 QoS parameter, or a PC5 QoS configuration profile.

In one embodiment, the identifier information of the source SLRB is a source SLRB identifier or a logical channel identifier corresponding to the source SLRB. The identifier information of the target SLRB is a target SLRB identifier or a logical channel identifier corresponding to the target SLRB.

In one embodiment, the case where the data on the source SLRB and of the PC5 QoS flow is transmitted completely includes the following.

An end marker sent by the first communication node is received. The end marker indicates that the data on the source SLRB and of the PC5 QoS flow is transmitted completely.

Based on whether to receive the end marker sent by the first communication node, the second communication node may determine whether the data of the PC5 QoS flow is transmitted completely. The end marker may indicate that the data on the source SLRB and of the PC5 QoS flow in which re-mapping is occurred is transmitted completely.

In one embodiment, the completion of the transmission of the data on the source SLRB and of the PC5 QoS flow includes: the source SLRB not receiving a data packet corresponding to an updated Packet Data Convergence Protocol sequence number, and a corresponding Packet Data Convergence Protocol reordering timer being expired.

In one embodiment, before the data on the source SLRB and of the PC5 QoS flow is transmitted completely, the method further includes: in the case where the data on the target SLRB and of the PC5 QoS flow in which re-mapping is occurred is received, buffering the data on the target SLRB and of the PC5 QoS flow on a Packet Data Convergence Protocol receiving buffer or a Service Data Adaptation Protocol receiving buffer and not transmitting to the upper layer.

Specifically, if the receiving UE receives the data on the target SLRB and of the QoS flow before receiving the end marker on the source SLRB and of the QFI, the receiving UE buffers the data temporarily (for example, on the PDCP buffer) and does not deliver the data to the upper layer first. When receiving the end marker (that is, the control/end-marker SDAP PDU) on the source SLRB and of the QFI, the receiving UE delivers the temporarily buffered data on the target SLRB and of the OFI to the upper layer so as to guarantee in-order delivery of data packets to the upper layer.

If only one PC5 QoS flow is mapped to each SLRB (and if the receiving UE does not receive the end marker on the original SLRB and of the QFI (PC5 QoS flow)), before the source SLRB does not receive a data packet corresponding to the latest PDCP SN (latest PDCP SN+1) and a corresponding PDCT reordering timer expires, the receiving UE, when receiving the data on the target SLRB and of the PC5 QoS flow, temporarily buffers the data (on the PDCP buffer) and does not deliver the data to the upper layer first. When the source SLRB does not receive the latest PDCP SN (latest PDCP SN+1) and a corresponding PDCT reordering timer expires, the receiving UE delivers the temporarily buffered data on the target SLRB and of the PC5 QoS flow to the upper layer so as to guarantee in-order delivery of data packets to the upper layer.

In one embodiment, the method further includes the following.

The SLRB configuration information sent by the first communication node is received.

The second communication node may perform SLRB configuration based on the SLRB configuration information sent by the first communication node.

In one embodiment, the SLRB configuration information includes a mapping relationship between an SLRB and PC5 QoS flows.

In one embodiment, the SLRB configuration information includes at least one of the following: a reordering timer parameter, out-of-order delivery indication, a reassembly timer parameter, or a status prohibition timer parameter.

Figure 5:
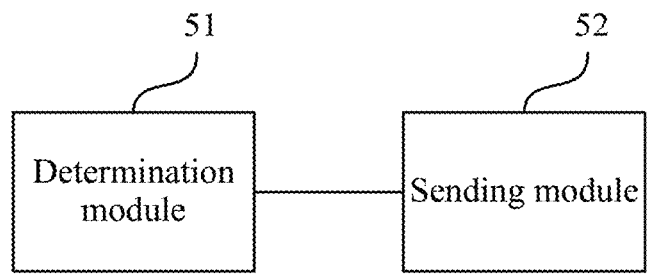
FIG. 5 is a diagram illustrating the structure of a data transmission apparatus according to the present application.

The present application provides a data transmission apparatus. FIG. 5 is a diagram illustrating the structure of a data transmission apparatus according to the present application. The data transmission apparatus in embodiments of the present application is arranged in a first communication node. As shown in FIG. 5, the apparatus includes a determination module 51 and a sending module 52. The determination module 51 is configured to determine remapping configuration information. The remapping configuration information indicates a PC5 QoS flow in which re-mapping is occurred, a source sidelink radio bearer (SLRB) corresponding to the PC5 QoS flow in which re-mapping is occurred, and a target SLRB corresponding to the PC5 QoS flow in which re-mapping is occurred. The sending module 52 is configured to send the remapping configuration information to a second communication node.

The data transmission apparatus provided in embodiments of the present application is configured to implement the data transmission method applied to a first communication node. The data transmission apparatus provided in this embodiment has similar implementation principles and technical effects to the data transmission method applied to a first communication node, which is not be repeated here.

In one embodiment, in the determination module 51, the remapping configuration information includes a modified mapping relationship between an SLRB and PC5 QoS flows.

In one embodiment, in the determination module 51, the remapping configuration information includes the identifier information of the PC5 QoS flow in which re-mapping is occurred, the identifier information of the corresponding source SLRB, and the identifier information of the corresponding target SLRB.

In one embodiment, in the determination module 51, the identifier information of the PC5 QoS flow in which re-mapping is occurred is a PC5 QoS flow identifier, a 5G quality of service identifier on a sidelink interface, a PC5 QoS parameter, or a PC5 QoS configuration profile.

In one embodiment, in the determination module 51, the identifier information of the source SLRB is a source SLRB identifier or a logical channel identifier corresponding to the source SLRB. The identifier information of the target SLRB is a target SLRB identifier or a logical channel identifier corresponding to the target SLRB.

In one embodiment, the apparatus further includes a receiving module configured to receive the configuration information sent by the base station. The configuration information includes a modified mapping relationship between an SLRB and PC5 QoS flows. Alternatively, the configuration information includes the identifier information of the PC5 QoS flow in which re-mapping is occurred, the identifier information of the corresponding source SLRB, and the identifier information of the corresponding target SLRB.

In one embodiment, in the receiving module, the modified mapping relationship between an SLRB and PC5 QoS flows includes one of the following: at least one PC5 QoS flow being deleted from the existing PC5 QoS flows that are mapped to the SLRB; a mapping relationship between a new SLRB and PC5 QoS flows being added; or at least one new PC5 QoS flow mapped to the SLRB being added in the existing mapping relationship between the SLRB and the PC5 QoS flows.

In one embodiment, the sending module is configured to send the remapping configuration information to the second communication node through a sidelink radio resource control message or send the remapping configuration information to the second communication node through a sidelink media access control-control element.

In one embodiment, the apparatus further includes an ending marker sending module configured to, in the case where the data on the source SLRB and of the PC5 QoS flow in which re-mapping is occurred is transmitted completely, send an end marker on the source SLRB to the second communication node. The end marker indicates that the data on the source SLRB and of the PC5 QoS flow in which re-mapping is occurred is transmitted completely.

In one embodiment, in the ending marker sending module, the end marker is a control-type Service Data Adaptation Protocol protocol data unit. The Service Data Adaptation Protocol protocol data unit includes a control-type indication of the Service Data Adaptation Protocol protocol data unit and a corresponding PC5 QoS flow identifier. Alternatively, the Service Data Adaptation Protocol protocol data unit includes the control-type indication of the Service Data Adaptation Protocol protocol data unit.

In one embodiment, the apparatus further includes an SLRB configuration information sending module configured to send SLRB configuration information to the second communication node. In one embodiment, in the SLRB configuration information sending module, the SLRB configuration information includes a mapping relationship between an SLRB and PC5 QoS flows. In one embodiment, in the SLRB configuration information sending module, the SLRB configuration information includes at least one of the following: a reordering timer parameter, out-of-order delivery indication, a reassembly timer parameter, or a status prohibition timer parameter.

In one embodiment, the apparatus further includes an SLRB configuration information receiving module configured to receive the SLRB configuration information sent by the base station. The SLRB configuration information sent by the base station includes a sidelink unicast identifier associated with an SLRB or a target layer 2 identifier index associated with an SLRB. The target layer 2 identifier index associated with an SLRB is an index number serialized based on the entry sequence of a target layer 2 identifier in sidelink user information.

Figure 6:
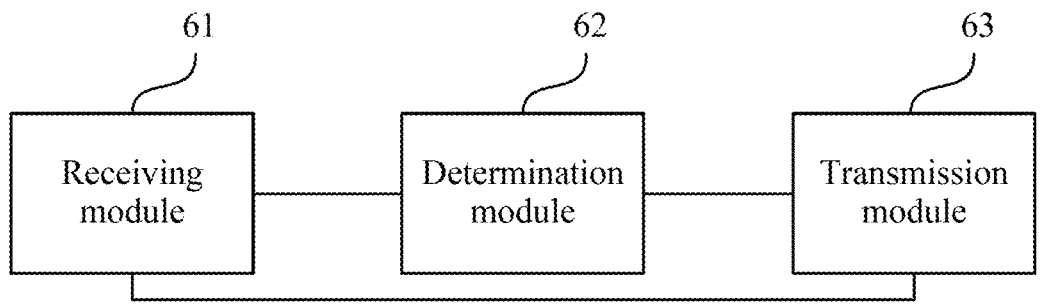
FIG. 6 is a diagram illustrating the structure of another data transmission apparatus according to the present application.

The present application further provides a data transmission apparatus. FIG. 6 is a diagram illustrating the structure of another data transmission apparatus according to the present application. The data transmission apparatus is arranged in a second communication node. As shown in FIG. 6, the data transmission apparatus includes a receiving module 61, a determination module 62, and a transmission module 3. The receiving module 61 is configured to receive the remapping configuration information sent by a first communication node. The determination module 62 is configured to determine a PC5 QoS flow in which re-mapping is occurred, a source SLRB corresponding to the PC5 QoS flow in which re-mapping is occurred, and a target SLRB corresponding to the PC5 QoS flow in which re-mapping is occurred based on the remapping configuration information. The transmission module 63 is configured to, in the case where the data on the source SLRB and of the PC5 QoS flow is transmitted completely, transmit the data on the target SLRB and of the PC5 QoS flow.

The data transmission apparatus provided in embodiments of the present application is configured to implement the data transmission method applied to a second communication node. The data transmission apparatus provided in this embodiment has similar implementation principles and technical effects to the data transmission method applied to a second communication node, which is not be repeated here.

In one embodiment, in the receiving module 61, the remapping configuration information includes a modified mapping relationship between an SLRB and PC5 QoS flows.

In one embodiment, in the receiving module 61, the modified mapping relationship between an SLRB and PC5 QoS flows includes one of the following: at least one PC5 QoS flow being deleted from the existing PC5 QoS flows that are mapped to the SLRB; a mapping relationship between a new SLRB and PC5 QoS flows being added; or at least one new PC5 QoS flow mapped to the SLRB being added in the existing mapping relationship between the SLRB and the PC5 QoS flows.

In one embodiment, in the receiving module 61, the remapping configuration information includes the identifier information of the PC5 QoS flow in which re-mapping is occurred, the identifier information of the source SLRB corresponding to the PC5 QoS flow in which re-mapping is occurred, and the identifier information of the target SLRB corresponding to the PC5 QoS flow in which re-mapping is occurred.

In one embodiment, in the receiving module 61, the identifier information of the PC5 QoS flow in which re-mapping is occurred is a PC5 QoS flow identifier, a 5G quality of service identifier on a sidelink interface, a PC5 QoS parameter, or a PC5 QoS configuration profile.

In one embodiment, in the receiving module 61, the identifier information of the source SLRB is a source SLRB identifier or a logical channel identifier corresponding to the source SLRB. The identifier information of the target SLRB is a target SLRB identifier or a logical channel identifier corresponding to the target SLRB.

In one embodiment, in the transmission module 63, the completion of transmission of the data on the source SLRB and of the PC5 QoS flow includes: receiving an end marker sent by the first communication node. The end marker indicates that the data on the source SLRB and of the PC5 QoS flow is transmitted completely.

In one embodiment, in the transmission module 63, the completion of transmission of the data on the source SLRB and of the PC5 QoS flow includes: the source SLRB not receiving a data packet corresponding to an updated Packet Data Convergence Protocol sequence number and a corresponding Packet Data Convergence Protocol reordering timer being expired.

In one embodiment, this apparatus further includes a first buffering module configured to, before the data on the source SLRB and of the PC5 QoS flow is transmitted completely, in the case where the data on the target SLRB and of the PC5 QoS flow in which re-mapping is occurred is received, buffer the data on the target SLRB and of the PC5 QoS flow on a Packet Data Convergence Protocol receiving buffer or a Service Data Adaptation Protocol receiving buffer. The data is not transmitted to the upper layer.

In one embodiment, the apparatus further includes an SLRB configuration information receiving module configured to receive the SLRB configuration information sent by the first communication node.

In one embodiment, in the SLRB configuration information receiving module, the SLRB configuration information includes a mapping relationship between an SLRB and PC5 QoS flows.

In one embodiment, in the SLRB configuration information receiving module, the SLRB configuration information includes at least one of: a reordering timer parameter, out-of-order delivery indication, a reassembly timer parameter, or a status prohibition timer parameter.

Figure 7:
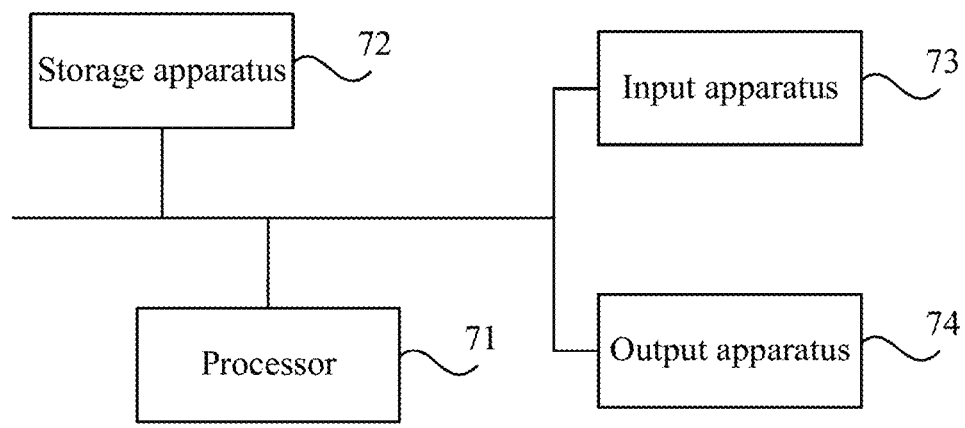
FIG. 7 is a diagram illustrating the structure of a first communication node according to the present application.

Embodiments of the present application further provide a first communication node. FIG. 7 is a diagram illustrating the structure of a first communication node according to the present application. As shown in FIG. 7, the first communication node provided in the present application includes one or more processors 71 and a storage apparatus 72. One or more processors 71 are provided in the first communication node. In FIG. 7, one processor 71 is taken as an example. The storage apparatus 72 is configured to store one or more programs. When executed by the one or more processors 71, the one or more programs cause the one or more processors 71 to perform the data transmission method according to embodiments of the present application.

The one or more processors 71 in the first communication node and the storage apparatus 72 in the first communication node are connected through a bus or in other manners. The connection through a bus is taken as an example in FIG. 7.

As a computer-readable storage medium, the storage apparatus 72 may be configured to store software programs, computer-executable programs and modules, such as program instructions/modules (for example, the determination module 51 and the sending module 52 that are in the data transmission apparatus) corresponding to the data transmission method according to embodiments of the present application. The storage apparatus 72 may include a program storage region and a data storage region. The program storage region may store an operating system and an application program required by at least one function. The data storage region may store data created depending on the use of a device. Additionally, the storage apparatus 72 may include a high-speed random-access memory and may further include a nonvolatile memory, such as at least one disk memory, a flash memory, or another nonvolatile solid-state memory. In some examples, the storage apparatus 72 may include memories located remotely relative to the one or more processors 71, and these remote memories may be connected to the device via a network. Examples of the preceding network include, but are not limited to, the Internet, an intranet, a local area network, a mobile communication network, and a combination thereof.

Figure 8:
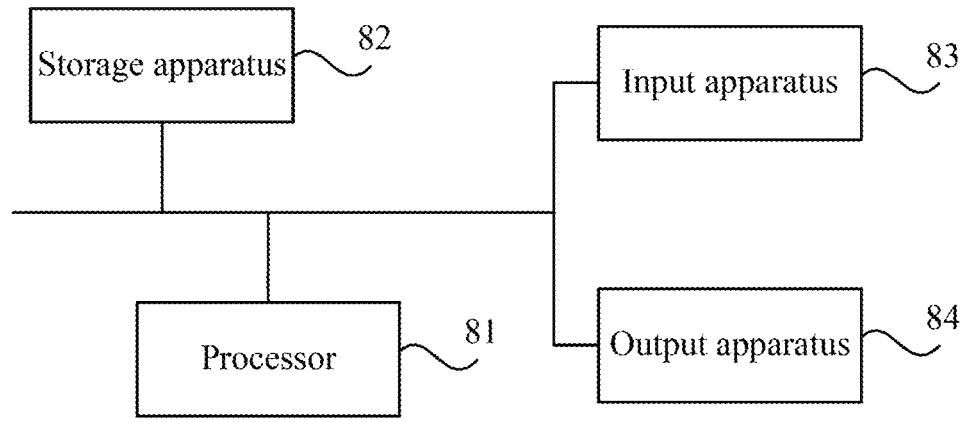
FIG. 8 is a diagram illustrating the structure of a second communication node according to the present application.

Embodiments of the present application further provide a second communication node. FIG. 8 is a diagram illustrating the structure of a second communication node according to the present application. As shown in FIG. 8, the second communication node provided in the present application includes one or more processors 81 and a storage apparatus 82. One or more processors 81 are provided in the second communication node. In FIG. 8, one processor 81 is taken as an example. The storage apparatus 82 is configured to store one or more programs. When executed by the one or more processors 81, the one or more programs cause the one or more processors 81 to perform the data transmission method according to embodiments of the present application.

The one or more processors 81 in the terminal and the storage apparatus 82 in the terminal are connected through a bus or in other manners. The connection through a bus is taken as an example in FIG. 8.

As a computer-readable storage medium, the storage apparatus 82 may be configured to store software programs, computer-executable programs and modules, such as program instructions/modules (for example, the receiving module 61, the determination module 62, and the transmission module 63 that are in the data transmission apparatus) corresponding to the data transmission method according to embodiments of the present application. The storage apparatus 82 may include a program storage region and a data storage region. The program storage region may store an operating system and an application program required by at least one function. The data storage region may store data created depending on the use of a device. Additionally, the storage apparatus 82 may include a high-speed random-access memory and may further include a nonvolatile memory, such as at least one disk memory, a flash memory, or another nonvolatile solid-state memory. In some examples, the storage apparatus 82 may include memories located remotely relative to the one or more processors 81, and these remote memories may be connected to the device via a network. Examples of the preceding network include, but are not limited to, the Internet, an intranet, a local area network, a mobile communication network, and a combination thereof.

Embodiments of the present application further provide a storage medium. The storage medium stores a computer program which, when executed by a processor, causes the processor to perform any data transmission method according to embodiments of the present application, for example, the data transmission method applied to a first communication node and the data transmission method applied to a second communication node. The data transmission method applied to a first communication node includes determining remapping configuration information, where the remapping configuration information indicates a PC5 QoS flow in which re-mapping is occurred, a source sidelink radio bearer (SLRB) corresponding to the PC5 QoS flow in which re-mapping is occurred, and a target SLRB corresponding to the PC5 QoS flow in which re-mapping is occurred; and sending the remapping configuration information to a second communication node. The data transmission method applied to a second communication node includes receiving the remapping configuration information sent by a first communication node; determining a PC5 QoS flow in which re-mapping is occurred, a source SLRB corresponding to the PC5 QoS flow in which re-mapping is occurred, and a target SLRB corresponding to the PC5 QoS flow in which re-mapping is occurred based on the remapping configuration information; and in the case where the data on the source SLRB and of the PC5 QoS flow in which re-mapping is occurred is transmitted completely, transmitting the data on the target SLRB and of the PC5 QoS flow in which re-mapping is occurred.

The above are only exemplary embodiments of the present application and are not intended to limit the scope of the present application.

It is to be understood by those skilled in the art that the term "terminal" covers any suitable type of radio UE, for example, a mobile phone, a portable data processing device, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM) and an optical memory device and system (digital video disc (DVD) or compact disc (CD)). Computer-readable media may include non-transitory storage media. The data processor may be of any type suitable to the local technical environment, such as, but is not limited to, a general purpose computer, a special purpose computer, a microprocessor, a digital signal processor (DSP), an application specific integrated circuit (ASIC), a field-programmable gate array (FGPA), and a processor based on a multi-core processor architecture.

The present application further provides a sidelink communication resource request method. The method specifically includes the examples below.

The sidelink communication resource request method is applied to a user equipment and includes the following.

An occasion of triggering the sidelink user equipment information to be sent is determined.

The content of the sidelink user equipment information is determined, and the sidelink user equipment information is sent to a base station.

As for a UE in the connected state, if being interested in or being no longer interested in sending or receiving sidelink communication, the UE in the connected state needs to notify the base station so as to request the base station to allocate or release a sidelink communication resource. Specifically, the base station is notified by triggering the UE to send the sidelink user equipment information (sidelinkUE-Information). In this embodiment, the triggering condition of sidelinkUEInformation is considered based on the characteristics of NR sidelink communication. In the case where the occasion of triggering the sidelink user equipment information to be sent is determined, the sidelink communication based on the user equipment can be classified into unicast, broadcast, and multicast. Different types of sidelink communication may correspond to different triggering occasions. After the occasion of triggering the sidelink user equipment information to be sent, the content of the corresponding sidelink user equipment information may be determined and sent to indicate the base station to perform communication resource processing. Different triggering occasions may correspond to the content of different sidelink user equipment information.

In one embodiment, the step of determining the occasion of triggering the sidelink user equipment information to be sent in the preceding sidelink communication resource request method includes the following.

In the case where the user equipment performs V2X sidelink communication, the upper-layer configuration of the user equipment performs receiving in V2X sidelink communication, and the user equipment obtains a valid V2X system information block from a system message of a serving cell;

in the case where the sidelink user equipment information is not sent to the base station after the user equipment enters the connected state, the system information of the serving cell to which the user equipment is connected after sending the sidelink user equipment information last time does not include the V2X system information block or the V2X system information block does not include the general configuration information of V2X communication, the sidelink user equipment information sent last time does not include the service target information or frequency point information which the user equipment is interested in receiving, or the sending of the service target information or frequency point information received by the upper-layer configuration changes after the sidelink user equipment information is sent last time;

the sidelink user equipment information is triggered to be sent.

In one embodiment, that the content of the sidelink user equipment information is determined in the preceding sidelink communication resource request method includes the following.

The sidelink user equipment information includes the service target information or frequency point information of V2X sidelink communication, where the user equipment is interested in receiving the service target information or frequency point information.

In one embodiment, that the occasion of triggering the sidelink user equipment information to be sent is determined in the preceding sidelink communication resource request method includes the following.

In the case where the user equipment performs V2X sidelink communication, the upper-layer configuration of the user equipment performs receiving in V2X sidelink communication, and the user equipment obtains a valid V2X system information block from a system message of a serving cell;

in the case where the information received by the upper-layer configuration of the user equipment in V2X sidelink communication no longer includes the service target or frequency point information of V2X sidelink communication, where the user equipment is interested in receiving the service target or frequency point information that has been sent previously in the sidelink user equipment information; the sidelink user equipment information is triggered to be sent.

In one embodiment, that the content of the sidelink user equipment information is determined in the preceding sidelink communication resource request method includes the following.

The sidelink user equipment information does not include the service target information or frequency point information of V2X sidelink communication, where the user equipment is not interested in receiving the service target information or frequency point information.

In one embodiment, that the occasion of triggering the sidelink user equipment information to be sent is determined in the preceding sidelink communication resource request method includes the following.

In the case where the user equipment performs V2X sidelink communication, the upper-layer configuration of the user equipment performs sending in V2X sidelink communication, and the user equipment obtains a valid V2X system information block from a system message of a serving cell;

in the case where the sidelink user equipment information is not sent to the base station after the user equipment enters the connected state, the system information of the serving cell to which the user equipment is connected after sending the sidelink user equipment information last time does not include the V2X system information block or the V2X system information block does not include the general configuration information of V2X communication, the sidelink user equipment information sent last time does not include the information of a V2X sidelink communication sending resource request, or the information in the V2X sidelink communication sending resource request changes after the sidelink user equipment information is sent last time; the sidelink user equipment information is triggered to be sent to indicate requesting a V2X sidelink communication sending resource.

In one embodiment, in the preceding sidelink communication resource request method, that the information in the V2X sidelink communication sending resource request changes includes at least one of the following: The sending of a new service type data is newly added; in a service type, the sending of a quality of service data flow is newly added; the sending of the data of a source identifier and target identifier is newly added; in a source identifier and target identifier, the sending of a PC5 QoS data flow is newly added; or the sending of new data on a frequency point is newly added.

In one embodiment, that the content of the sidelink user equipment information is determined in the preceding sidelink communication resource request method includes the following.

The sidelink user equipment information includes at least one of the following: a target identifier of a newly-added service type, an identifier of a newly-added quality of service data flow in a service type, a newly-added source identifier and target identifier, a newly-added PC5 QoS data flow in a source identifier and target identifier, or a newly-added frequency point.

In one embodiment, that the occasion of triggering the sidelink user equipment information to be sent is determined in the preceding sidelink communication resource request method includes the following.

In the case where the user equipment performs V2X sidelink communication, the upper-layer configuration of the user equipment performs sending in V2X sidelink communication, and the user equipment obtains a valid V2X system information block from a system message of a serving cell;

in the case where a service type is no longer sent through the V2X sidelink communication of the upper-layer configuration of the user equipment, a PC5 QoS flow is no longer sent on a service type, the data of a source identifier and target identifier is no longer sent, a PC5 QoS flow is no longer sent on a source identifier and target identifier, or the service type or PC5 QoS flow is not sent on a frequency point; the sidelink user equipment information is triggered to be sent to indicate that a corresponding V2X sidelink communication sending resource is no longer needed. In one embodiment, that the content of the sidelink user equipment information is determined in the preceding sidelink communication resource request method includes the following.

The sidelink user equipment information does not include at least one of the following: the first target data no longer sent or the frequency point of the first target data no longer sent. The first target data includes a type service no longer sent; a PC5 QoS flow no longer sent on a service type; the data of a source identifier and target identifier, where the data is no longer sent; or a PC5 QoS flow no longer sent on a source identifier and target identifier.

In one embodiment, in the preceding sidelink communication resource request method, V2X sidelink communication includes V2X sidelink broadcast communication or V2X sidelink multicast communication.

Specifically, as for V2X sidelink broadcast/multicast communication, if the UE obtains a valid V2X system information block (SIB) from a system broadcast message of a serving cell, there will exist 1) and 2) below under this precondition.

1) If the upper-layer configuration of the UE performs receiving in V2X sidelink broadcast/multicast communication (for example, the V2X layer of the UE indicates that the data of a service type/service target/destination ID is received), there will exist operations in the two paragraphs below.

In one of the following cases, the UE triggers the sidelinkUEInformation to be sent to the base station to indicate the service target (that is, destination ID) or frequency point information of V2X sidelink broadcast/groupcast communication, where the UE is interested in receiving the service target (that is, destination ID) or frequency point information: The UE has not sent the sidelink user equipment information (sidelinkUEInformation) to the base station since entering the connected state; the system broadcast message of the serving cell to which the UE is connected after sending the sidelinkUEInformation last time does not include a V2X SIB, or the V2X SIB does not include V2X communication general configuration information; the sidelinkUEInformation sent last time does not include the service target (that is, destination ID) information or frequency point information which the UE is interested in receiving; or the service target (that is, destination ID) information or frequency point information received by the upper-layer configuration changes after the sidelinkUEInformation is sent last time.

The UE triggers the sidelinkUEInformation to be sent to the base station to indicate the service target (that is, destination ID) or frequency point information, which the UE is no longer interested in receiving, of V2X sidelink broadcast/groupcast communication; in the case where the sent sidelinkUEInformation includes the service target (that is, destination ID) or frequency point information, which the UE is interested in receiving, of V2X sidelink broadcast/groupcast communication; in the case where the information received by the upper-layer configuration of the UE in V2X sidelink broadcast/groupcast communication no longer includes certain service target (that is, destination ID) or frequency point information.

2) If the upper-layer configuration of the UE performs sending in V2X sidelink broadcast/multicast communication, there will exist operations in the two paragraphs below.

In one of the following cases, the UE triggers the sidelinkUEInformation to be sent to the base station to indicate requesting a V2X sidelink broadcast/multicast communication sending resource: The UE has not sent the sidelinkUEInformation to the base station since entering the connected state; the system broadcast message of the serving cell to which the UE is connected after sending the sidelinkUEInformation last time does not include a V2X SIB, or the V2X SIB does not include V2X communication general configuration information; the sidelinkUEInformation sent last time does not include the information of a V2X sidelink broadcast/multicast communication sending resource request; or the information in the V2X sidelink broadcast/multicast communication sending resource request changes after the sidelinkUEInformation is sent last time. That the information in the V2X sidelink broadcast/multicast communication sending resource request changes includes at least one of the following: The sending of a new service type (that is, destination ID) data is newly added; in a service type (that is, destination ID), the sending of a quality of service data flow (PC5 QoS flow) is newly added; the sending of the data of a source identifier and target identifier (source ID-destination ID) is newly added; in a source and target (source ID-destination ID), the sending of a quality of service data flow (PC5 QoS flow) is newly added; or the sending of certain service type data on a frequency point is newly added. The newly-sent service type (that is, destination ID), the newly-sent data of a source and target (source ID-destination ID), the new PC5 QoS flow, or the new frequency point information is from an indication of the upper layer. The source ID and the destination ID are from the upper layer (that is, the V2X layer) and are layer 2 identifiers (L2 IDs) allocated by the upper layer.

The UE triggers the sidelinkUEInformation to be sent to the base station to indicate that a corresponding V2X sidelink broadcast/multicast communication sending resource is no longer needed; in the case where the sidelinkUEInformation is sent, the sent sidelinkUEInformation includes a V2X sidelink broadcast/multicast communication sending resource request and includes a service type (that is, destination ID), a source and target (source ID-destination ID), a PC5 QoS flow, or a frequency point; in the case where the upper-layer configuration of the UE in V2X sidelink broadcast/multicast communication no longer sends (releases) a service type (that is, destination ID), no longer sends a PC5 QoS flow on a service type (that is, destination ID), no longer sends the data of a source and target (source ID-destination ID), no longer sends a PC5 QoS flow on a source and target (source ID-destination ID), or no longer performs sending on a frequency point.

In one embodiment, that the occasion of triggering the sidelink user equipment information to be sent is determined in the preceding sidelink communication resource request method includes the following.

In the case where the user equipment performs V2X sidelink unicast communication, the upper-layer configuration of the user equipment performs receiving in V2X sidelink unicast communication, and the user equipment obtains a valid V2X system information block from a system message of a serving cell;

in the case where the sidelink user equipment information is not sent to the base station after the user equipment enters the connected state, the system message of the serving cell to which the user equipment is connected after sending the sidelink user equipment information last time does not include the V2X system information block or the V2X system information block does not include the general configuration information of V2X communication, the sidelink user equipment information sent last time does not include the opposite-end user equipment information or frequency point information which the user equipment is interested in receiving, or the opposite-end user equipment information or frequency point information received by the upper-layer configuration changes after the sidelink user equipment information is sent last time; the sidelink user equipment information is triggered to be sent to indicate the opposite-end user equipment information or frequency point information of V2X sidelink unicast communication, where the user equipment is interested in receiving the opposite-end user equipment information or frequency point information.

In one embodiment, that the content of the sidelink user equipment information is determined in the preceding sidelink communication resource request method includes the following.

The sidelink user equipment information includes the opposite-end user equipment information or frequency point information of V2X sidelink unicast communication, where the user equipment is interested in receiving the opposite-end user equipment information or frequency point information.

In one embodiment, that the occasion of triggering the sidelink user equipment information to be sent is determined in the preceding sidelink communication resource request method includes the following.

In the case where the user equipment performs V2X sidelink unicast communication, the upper-layer configuration of the user equipment performs receiving in V2X sidelink unicast communication, and the user equipment obtains a valid V2X system information block from a system message of a serving cell;

in the case where the information received by the upper-layer configuration of the user equipment in V2X sidelink unicast communication no longer includes the opposite-end user equipment information or frequency point information of V2X sidelink unicast communication, where the user equipment is interested in receiving the opposite-end user equipment information or frequency point information that has been sent previously in the sidelink user equipment information;

the sidelink user equipment information is triggered to be sent to indicate the opposite-end user equipment information or frequency point information of V2X sidelink unicast communication, where the user equipment is no longer interested in receiving the opposite-end user equipment information or frequency point information.

In one embodiment, that the content of the sidelink user equipment information is determined in the preceding sidelink communication resource request method includes the following.

The sidelink user equipment information does not include the opposite-end user equipment information or frequency point information of V2X sidelink unicast communication, where the user equipment is no longer interested in receiving the opposite-end user equipment information or frequency point information.

In one embodiment, that the occasion of triggering the sidelink user equipment information to be sent is determined in the preceding sidelink communication resource request method includes the following.

In the case where the user equipment performs V2X sidelink unicast communication, the upper-layer configuration of the user equipment performs sending in V2X sidelink unicast communication, and the user equipment obtains a valid V2X system information block from a system message of a serving cell, in the case where the sidelink user equipment information is not sent to the base station after the user equipment enters the connected state, the system message of the serving cell to which the user equipment is connected after sending the sidelink user equipment information last time does not include the V2X system information block or the V2X system information block does not include the general configuration information of V2X communication, the sidelink user equipment information sent last time does not include the information of a V2X sidelink unicast communication sending resource request, or the information in the V2X sidelink unicast communication sending resource request changes after the sidelink user equipment information is sent last time;

the sidelink user equipment information is triggered to be sent to indicate requesting a V2X sidelink unicast communication sending resource.

In one embodiment, in the preceding sidelink communication resource request method, that the information in the V2X sidelink unicast communication sending resource request changes includes at least one of the following: The sending of the data of an opposite-end user equipment is newly added; on an opposite-end user equipment, the sending of a quality of service data flow is newly added; the sending of the data of a source identifier and target identifier is newly added; the sending of the data of a sidelink unicast identifier is newly added; on a sidelink unicast identifier, the sending of a quality of service data flow is newly added; in a source identifier and target identifier, the sending of a quality of service data flow is newly added; or the sending of the data of the opposite-end user equipment on a frequency point is newly added.

In one embodiment, that the content of the sidelink user equipment information is determined in the preceding sidelink communication resource request method includes the following.

The sidelink user equipment information includes at least one of the following: a newly-added opposite-end user equipment, a newly-added quality of service data flow on an opposite-end user equipment, a newly-added source identifier and target identifier, a newly-added quality of service data flow in a source identifier and target identifier, a newly-added sidelink unicast identifier, a newly-added quality of service data flow on a sidelink unicast identifier, or a newly-added frequency point.

In one embodiment, that the occasion of triggering the sidelink user equipment information to be sent is determined in the preceding sidelink communication resource request method includes the following.

In the case where the user equipment performs V2X sidelink unicast communication, the upper-layer configuration of the user equipment performs sending in V2X sidelink unicast communication, and the user equipment obtains a valid V2X system information block from a system message of a serving cell;

in the case where data is no longer sent to an opposite-end user equipment through the V2X sidelink unicast communication of the upper-layer configuration of the user equipment, a PC5 QoS flow is no longer sent to the opposite-end user equipment, data is no longer sent to a source identifier and target identifier, a PC5 QoS flow is no longer sent to the source identifier and target identifier, the data as for a sidelink unicast identifier is no longer sent, a PC5 QoS flow is no longer sent as for a sidelink unicast identifier, or sending is not performed on a frequency point; the sidelink user equipment information is triggered to be sent to indicate that a corresponding V2X sidelink unicast communication sending resource is no longer needed.

In one embodiment, that the content of the sidelink user equipment information is determined in the preceding sidelink communication resource request method includes the following.

The sidelink user equipment information does not include at least one of the following: the second target data no longer sent or the frequency point of the second target data no longer sent. The second target data includes the data no longer sent to an opposite-end user equipment, a PC5 QoS flow no longer sent to the opposite-end user equipment, data no longer sent to a source identifier and target identifier, a PC5 QoS flow no longer sent to the source identifier and target identifier, the data as for a sidelink unicast identifier no longer sent, or a PC5 QoS flow no longer sent as for a sidelink unicast identifier.

Specifically, as for V2X sidelink unicast communication, if the UE obtains a valid V2X SIB from a system broadcast message of a serving cell, there will exist 1) and 2) below under this precondition.

1) If the upper-layer configuration of the UE performs receiving in V2X sidelink unicast communication (for example, the V2X layer of the UE indicates that the data of an opposite-end UE (that is, destination ID) is received), there will exist operations in the two paragraphs below. In one of the following cases, the UE triggers the sidelinkUEInformation to be sent to the base station to indicate the opposite-UE information (that is, destination ID) or frequency point information of V2X sidelink unicast communication, where the UE is interested in receiving the opposite-UE information (that is, destination ID) or frequency point information: The UE has not sent the sidelinkUEInformation to the base station since entering the connected state; the system broadcast message of the serving cell to which the UE is connected after sending the sidelinkUEInformation last time does not include a V2X SIB, or the V2X SIB does not include V2X communication general configuration information; the sidelinkUEInformation sent last time does not include the opposite-UE information (that is, destination ID) information or frequency point information which the UE is interested in receiving; or the opposite-UE information (that is, destination ID) information or frequency point information received by the upper-layer configuration changes after the sidelinkUEInformation is sent last time.

The UE triggers the sidelinkUEInformation to be sent to the base station to indicate the opposite-UE (that is, destination ID) or frequency point information, which the UE is no longer interested in receiving, of V2X sidelink unicast communication; in the case where the sent sidelinkUEInformation includes the opposite-UE (that is, destination ID) or frequency point information, which the UE is interested in receiving, of V2X sidelink unicast communication; in the case where the information received by the upper-layer configuration of the UE in V2X sidelink unicast communication no longer includes a certain opposite-UE (that is, destination ID) or frequency point information. The Destination ID is the L2 ID of the opposite-end UE.

2) If the upper-layer configuration of the UE performs sending in V2X sidelink unicast communication, there will exist operations in the two paragraphs below.

In one of the following cases, the UE triggers the sidelinkUEInformation to be sent to the base station to indicate requesting a V2X sidelink unicast communication sending resource: The UE has not sent the sidelinkUEInformation to the base station since entering the connected state; the system broadcast message of the serving cell to which the UE is connected after sending the sidelinkUEInformation last time does not include a V2X SIB, or the V2X SIB does not include V2X communication general configuration information; the sidelinkUEInformation sent last time does not include the information of a V2X sidelink unicast communication sending resource request; or the information in the V2X sidelink unicast communication sending resource request changes after the sidelinkUEInformation is sent last time. That the information in the V2X sidelink unicast communication sending resource request changes includes at least one of the following: The sending of the data of an opposite-end UE (that is, destination ID) is newly added; in an opposite-end UE (that is, destination ID), the sending of a quality of service data flow (PC5 QoS flow) is newly added; the sending of the data of a source and target (source ID-destination ID) is newly added; in a source and target (source ID-destination ID), the sending of a quality of service data flow (PC5 QoS flow) is newly added; or the sending of the data of an opposite-end UE on a frequency point is newly added. The newly-sent opposite-end UE (that is, destination ID), the newly-sent data of a source and target (source ID-destination ID), the new PC5 QoS flow, or the new frequency point information is from an indication of the upper layer. The source ID and the destination ID are from the upper layer and are L2 IDs allocated by the upper layer. The opposite-end UE is identified by the destination ID/destination L2 ID, that is, the L2 ID of the opposite-end UE.

The UE triggers the sidelinkUEInformation to be sent to the base station to indicate that a corresponding V2X sidelink unicast communication sending resource is no longer needed; in the case where the sent sidelinkUEInformation includes a V2X sidelink unicast communication sending resource request and includes an opposite-end UE (that is, destination ID), a source and target (source ID-destination ID), a PC5 QoS flow, or a frequency point; in the case where the upper-layer configuration of the UE in V2X sidelink unicast communication no longer sends data to an opposite-end UE (that is, destination ID), no longer sends a PC5 QoS flow to an opposite-end UE (that is, destination ID), no longer sends data to a source and target (source ID-destination ID), no longer sends a PC5 QoS flow to a source and target (source ID-destination ID), or no longer performs sending on a frequency point.

In one embodiment, that the occasion of triggering the sidelink user equipment information to be sent is determined in the preceding sidelink communication resource request method includes the following.

When the layer 2 identifier of an opposite-end user equipment is obtained, the sidelink user equipment information is triggered to be sent to indicate requesting a sidelink unicast communication sending resource.

In one embodiment, the sidelink user equipment information in the preceding sidelink communication resource request method includes at least one of the following: a target layer 2 identifier of unicast communication; a unicast communication type; a source layer 2 identifier and a target layer 2 identifier of unicast communication; a sidelink interface signaling radio bearer or a sidelink interface radio resource control signaling indication; a sidelink unicast identifier; or the PC5 QoS flow information in a sidelink unicast identifier, in a target layer 2 identifier of unicast communication, or in a source layer 2 identifier and a target layer 2 identifier of unicast communication.

In one embodiment, the sidelink user equipment information in the preceding sidelink communication resource request method includes at least one of the following: a target layer 2 identifier of unicast communication; a unicast communication type; a source layer 2 identifier and a target layer 2 identifier of unicast communication; a sidelink unicast identifier; or a sidelink interface signaling radio bearer or a sidelink interface radio resource control signaling indication. Correspondingly, it includes the following.

In the case where the capability interaction of user equipments is completed or the sidelink interface radio resource control connection is established completely, the sidelink user equipment information, including the PC5 QoS flow information in a sidelink unicast identifier, in a target layer 2 identifier of unicast communication, or in a source layer 2 identifier and a target layer 2 identifier of unicast communication, is sent.

In one embodiment, the PC5 QoS flow information in the preceding sidelink communication resource request method includes a PC5 QoS flow identifier, a PC5 QoS parameter, or a PC5 QoS configuration profile.

In one embodiment, the preceding sidelink communication resource request method further includes the following.

The sidelink bearer configuration information sent by the base station is received. The sidelink bearer configuration information sent by the base station includes a sidelink unicast identifier associated with a sidelink bearer or a target layer 2 identifier index associated with a sidelink bearer. The target layer 2 identifier index associated with a sidelink bearer is an index number serialized based on the entry sequence of the target layer 2 identifier in the sidelink user information.

Figure 9:
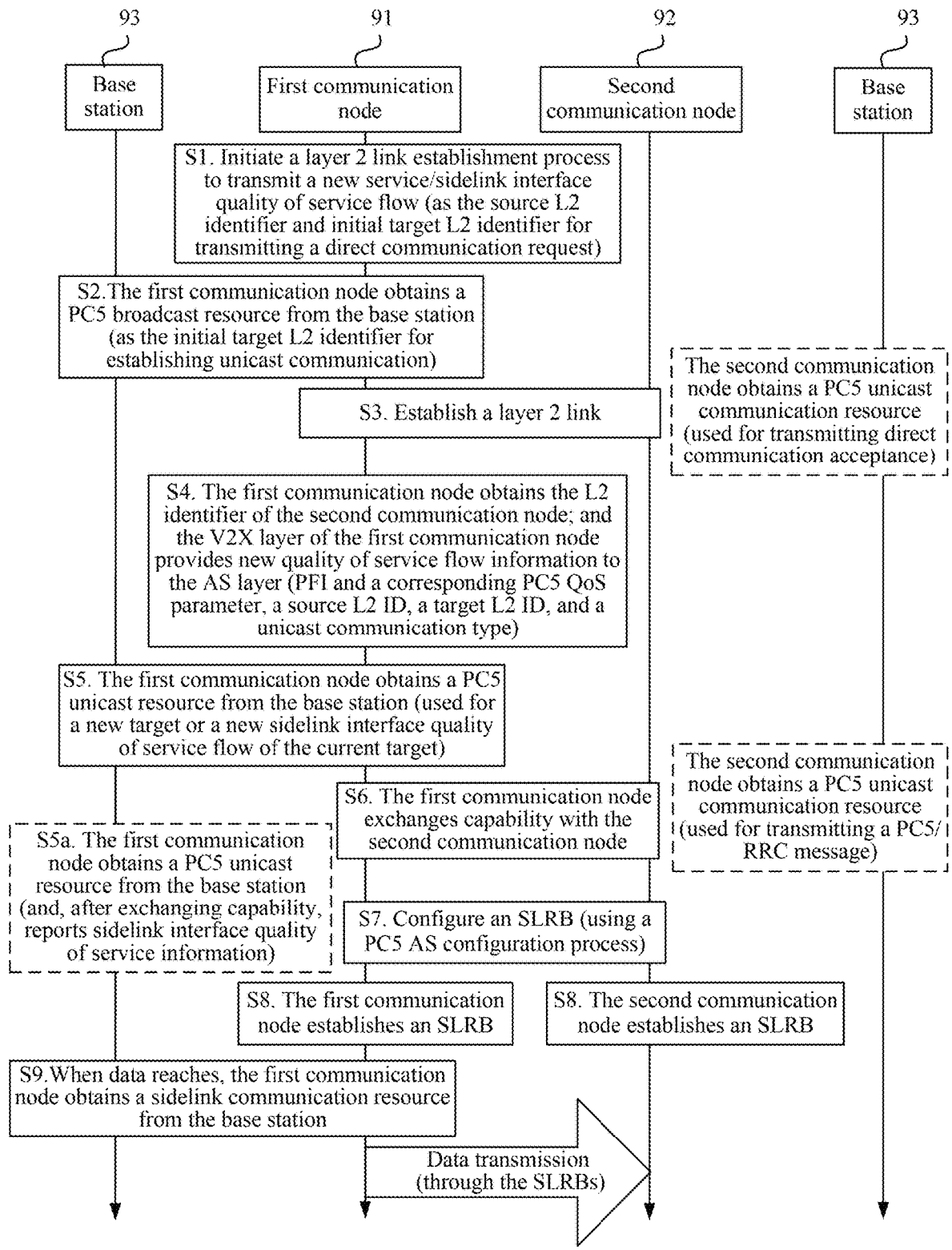
FIG. 9 is a flowchart illustrating that user equipments perform unicast communication.

Specifically, FIG. 9 is a flowchart illustrating that user equipments perform unicast communication. Referring to FIG. 9, UE1 is a first communication node 91. UE 2 is a second communication node 92, which is a UE in the RRC connected state. UE1 and UE2 are in the same base station 93 or different base stations 93. UE1 initiates the V2X sidelink unicast communication with UE2. This embodiment describes the timing sequence process in which UE1 performs unicast communication with UE2 and obtains a sidelink unicast communication resource (that triggers sidelink UE Information) from a base station.

S1 to S4 mainly include the operations hereinafter. UE1 initiates an L2 link establishment process and provides the source and initial target L2 ID that initiates L2 link establishment so as to send a direct communication request message. UE1 triggers the sidelinkUEInformation to request a sidelink broadcast sending resource from the base station to send an L2 link establishment request message on the initial target L2 ID. That is, the sidelinkUEInformation includes the initial target L2 ID, or the source L2 ID and the initial target L2 ID. After obtaining a sidelink broadcast resource, UE1 sends a direct communication request message. When receiving a direct communication accept message sent by UE2, UE1 obtains the L2 ID of UE2 and takes the L2 ID of UE 2 as the target L2 ID of UE2 for unicast communication. The V2X layer of UE1 provides unicast communication-related information, for example, a source L2 ID, a target L2 ID, a unicast communication type, and PC5 QoS flow information (a PFI and a corresponding PC5 QoS parameter), to the AS layer.

S5 to S6 mainly include the operations hereinafter. UE1 obtains the L2 ID of UE2 and takes the L2 ID of UE2 as the target L2 ID of UE2 for unicast communication. UE1 triggers the sidelinkUEInformation to be sent to request a sidelink unicast sending resource from the base station. That is, the sidelinkUEInformation includes at least one of a target L2 ID of unicast communication; the unicast communication type; a source L2 ID and a target L2 ID of unicast communication; a sidelink unicast identifier (PC5 link identifier); a PC5 SRB or PC5 RRC indication (indicating that a PC5 SRB is requested to be configured for sending PC5 RRC signaling); or the PC5 QoS flow information in a target L2 ID of unicast communication, in a sidelink unicast identifier (PC5 link identifier), or in a source L2 ID and a target L2 ID of unicast communication. The PC5 QoS flow information includes a PFI and a corresponding PC5 QoS parameter. The PC5 QoS parameter includes at least one of the following information: a PQI, a GFBR/MFBR, a PC5 link AMBR, or a communication range. After obtaining a sidelink unicast sending resource, UE1 exchanges UE capability information with UE2 or establishes a PC5 RRC connection. Alternatively, in S5, the sidelink user equipment information (sidelinkUEInformation) that is triggered by UE1 to be sent does not include a target L2 ID of unicast communication; a sidelink unicast identifier (that is, PC5 link identifier), or the PC5 QoS flow information in a source L2 ID and a target L2 ID of unicast communication. After UE capability interaction or PC5 RRC connection establishment is completed, S5a is performed; that is, UE1 triggers the sidelinkUEInformation to be sent again to request a sidelink unicast sending resource from the base station to send the data of a QoS parameter. The base station configures an SLRB for the UE and allocates a sidelink unicast communication sending resource. The base station configures an SLRB for the UE. The SLRB configuration information includes a PC5 link identifier associated with an SLRB or a target layer 2 identifier index (that is, destination index) associated with an SLRB. The target layer 2 identifier index associated with an SLRB is an index number serialized based on the entry sequence of the dest L2 ID in the sidelinkUEInformation.

S7 to S9 mainly include the operations hereinafter. After obtaining the SLRB configuration information configured by the base station, UE1 sends the SLRB configuration information to UE2 through PC5 RRC configuration signaling. If accepting the SLRB configuration, UE2 will reply SLRB configuration response information and establish a corresponding SLRB. After receiving the response information of UE2, UE1 establishes a corresponding SLRB. When data reaches, UE1 obtains a sidelink unicast communication sending resource from the base station and sends corresponding data through the established SLRB.

According to the sidelink communication resource request method provided in the present application, an occasion of triggering the sidelink user equipment information to be sent is determined; and the content of the sidelink user equipment information is determined, and the sidelink user equipment information is sent to a base station. It can effectively request a base station to allocate or release a sidelink communication resource.

The present application provides a sidelink communication resource request apparatus. The apparatus is applied to a user equipment and includes an occasion determination module and a sending module.

The occasion determination module is configured to determine an occasion of triggering the sidelink user equipment information to be sent.

The sending module is configured to determine the content of the sidelink user equipment information and send the sidelink user equipment information to a base station.

In one embodiment, the occasion determination module is configured to trigger the sidelink user equipment information to be sent in the case where the user equipment performs V2X sidelink communication, the upper-layer configuration of the user equipment performs receiving in V2X sidelink communication, and the user equipment obtains a valid V2X system information block from a system message of a serving cell; in the case where the sidelink user equipment information is not sent to the base station after the user equipment enters the connected state, the system information of the serving cell to which the user equipment is connected after sending the sidelink user equipment information last time does not include the V2X system information block or the V2X system information block does not include the general configuration information of V2X communication, the sidelink user equipment information sent last time does not include the service target information or frequency point information which the user equipment is interested in receiving, or the sending of the service target information or frequency point information received by the upper-layer configuration changes after the sidelink user equipment information is sent last time.

In one embodiment, the sending module is configured such that the sidelink user equipment information includes the service target information or frequency point information of V2X sidelink communication, where the user equipment is interested in receiving the service target information or frequency point information.

In one embodiment, the occasion determination module is configured to trigger the sidelink user equipment to be sent in the case where the user equipment performs V2X sidelink communication, the upper-layer configuration of the user equipment performs receiving in V2X sidelink communication, and the user equipment obtains a valid V2X system information block from a system message of a serving cell; in the case where the information received by the upper-layer configuration of the user equipment in V2X sidelink communication no longer includes the service target or frequency point information of V2X sidelink communication, where the user equipment is interested in receiving the service target or frequency point information that has been sent previously in the sidelink user equipment information.

In one embodiment, the sending module is configured such that the sidelink user equipment information does not include the service target information or frequency point information of V2X sidelink communication, where the user equipment is not interested in receiving the service target information or frequency point information.

In one embodiment, the occasion determination module is configured to trigger the sidelink user equipment information to be sent to indicate requesting a V2X sidelink communication sending resource; in the case where the user equipment performs V2X sidelink communication, the upper-layer configuration of the user equipment performs sending in V2X sidelink communication, and the user equipment obtains a valid V2X system information block from a system message of a serving cell; in the case where the sidelink user equipment information is not sent to the base station after the user equipment enters the connected state, the system information of the serving cell to which the user equipment is connected after sending the sidelink user equipment information last time does not include the V2X system information block or the V2X system information block does not include the general configuration information of V2X communication, the sidelink user equipment information sent last time does not include the information of a V2X sidelink communication sending resource request, or the information in the V2X sidelink communication sending resource request changes after the sidelink user equipment information is sent last time.

In one embodiment, in the occasion determination module, that the information in the V2X sidelink communication sending resource request changes includes at least one of the following: The sending of a new service type data is newly added; in a service type, the sending of a quality of service data flow is newly added; the sending of the data of a source identifier and target identifier is newly added; in a source identifier and target identifier, the sending of a PC5 QoS data flow is newly added; or the sending of new data on a frequency point is newly added.

In one embodiment, the sending module is configured such that the sidelink user equipment information includes at least one of the following: a target identifier of a newly-added service type, an identifier of a newly-added quality of service data flow in a service type, a newly-added source identifier and target identifier, a newly-added PC5 QoS data flow in a source identifier and target identifier, or a newly-added frequency point.

In one embodiment, the occasion determination module is configured to trigger the sidelink user equipment information to be sent to indicate that a corresponding V2X sidelink communication sending resource is no longer needed; in the case where the user equipment performs V2X sidelink communication, the upper-layer configuration of the user equipment performs sending in V2X sidelink communication, and the user equipment obtains a valid V2X system information block from a system message of a serving cell; in the case where a service type is no longer sent through the V2X sidelink communication of the upper-layer configuration of the user equipment, a PC5 QoS flow is no longer sent on a service type, the data of a source identifier and target identifier is no longer sent, a PC5 QoS flow is no longer sent on a source identifier and target identifier, or the service type or PC5 QoS flow is not sent on a frequency point.

In one embodiment, the sending module is configured such that the sidelink user equipment information does not include at least one of the following: the first target data no longer sent or the frequency point of the first target data no longer sent. The first target data includes a type service no longer sent; a PC5 QoS flow no longer sent on a service type; the data of a source identifier and target identifier, where the data is no longer sent; or a PC5 QoS flow no longer sent on a source identifier and target identifier.

In one embodiment, V2X sidelink communication includes V2X sidelink broadcast communication or V2X sidelink multicast communication.

In one embodiment, the occasion determination module is configured to trigger the sidelink user equipment information to be sent to indicate the opposite-end user equipment information or frequency point information of V2X sidelink unicast communication, where the user equipment is interested in receiving the opposite-end user equipment information or frequency point information; in the case where the user equipment performs V2X sidelink unicast communication, the upper-layer configuration of the user equipment performs receiving in V2X sidelink unicast communication, and the user equipment obtains a valid V2X system information block from a system message of a serving cell; in the case where the sidelink user equipment information is not sent to the base station after the user equipment enters the connected state, the system message of the serving cell to which the user equipment is connected after sending the sidelink user equipment information last time does not include the V2X system information block or the V2X system information block does not include the general configuration information of V2X communication, the sidelink user equipment information sent last time does not include the opposite-end user equipment information or frequency point information which the user equipment is interested in receiving, or the opposite-end user equipment information or frequency point information received by the upper-layer configuration changes after the sidelink user equipment information is sent last time.

In one embodiment, the sending module is configured such that the sidelink user equipment information includes the opposite-end user equipment information or frequency point information of V2X sidelink unicast communication, where the user equipment is interested in receiving the opposite-end user equipment information or frequency point information.

In one embodiment, the occasion determination module is configured to trigger the sidelink user equipment information to be sent to indicate the opposite-end user equipment information or frequency point information of V2X sidelink unicast communication, where the user equipment is no longer interested in receiving the opposite-end user equipment information or frequency point information; in the case where the user equipment performs V2X sidelink unicast communication, the upper-layer configuration of the user equipment performs receiving in V2X sidelink unicast communication, and the user equipment obtains a valid V2X system information block from a system message of a serving cell; in the case where the information received by the upper-layer configuration of the user equipment in V2X sidelink unicast communication no longer includes the opposite-end user equipment information or frequency point information of V2X sidelink unicast communication, where the user equipment is interested in receiving the opposite-end user equipment information or frequency point information that has been sent previously in the sidelink user equipment information.

In one embodiment, the sending module is configured such that the sidelink user equipment information does not include the opposite-end user equipment information or frequency point information of V2X sidelink unicast communication, where the user equipment is no longer interested in receiving the opposite-end user equipment information or frequency point information.

In one embodiment, the occasion determination module is configured to trigger the sidelink user equipment information to be sent to indicate requesting a V2X sidelink unicast communication sending resource; in the case where the user equipment performs V2X sidelink unicast communication, the upper-layer configuration of the user equipment performs sending in V2X sidelink unicast communication, and the user equipment obtains a valid V2X system information block from a system message of a serving cell; in the case where the sidelink user equipment information is not sent to the base station after the user equipment enters the connected state, the system message of the serving cell to which the user equipment is connected after sending the sidelink user equipment information last time does not include the V2X system information block or the V2X system information block does not include the general configuration information of V2X communication, the sidelink user equipment information sent last time does not include the information of a V2X sidelink unicast communication sending resource request, or the information in the V2X sidelink unicast communication sending resource request changes after the sidelink user equipment information is sent last time.

In one embodiment, in the occasion determination module, that the information in the V2X sidelink unicast communication sending resource request changes includes at least one of the following: The sending of the data of an opposite-end user equipment is newly added; on an opposite-end user equipment, the sending of a quality of service data flow is newly added; the sending of the data of a source identifier and target identifier is newly added; the sending of the data of a sidelink unicast identifier is newly added; on a sidelink unicast identifier, the sending of a quality of service data flow is newly added; in a source identifier and target identifier, the sending of a quality of service data flow is newly added; or the sending of the data of the opposite-end user equipment on a frequency point is newly added.

In one embodiment, the sending module is configured such that the sidelink user equipment information includes at least one of the following: a newly-added opposite-end user equipment, a newly-added quality of service data flow on an opposite-end user equipment, a newly-added source identifier and target identifier, a newly-added quality of service data flow in a source identifier and target identifier, a newly-added sidelink unicast identifier, a newly-added quality of service data flow on a sidelink unicast identifier, or a newly-added frequency point.

In one embodiment, the occasion determination module is configured to trigger the sidelink user equipment information to be sent to indicate that a corresponding V2X sidelink unicast communication sending resource is no longer needed; in the case where the user equipment performs V2X sidelink unicast communication, the upper-layer configuration of the user equipment performs sending in V2X sidelink unicast communication, and the user equipment obtains a valid V2X system information block from a system message of a serving cell; in the case where data is no longer sent to an opposite-end user equipment through the V2X sidelink unicast communication of the upper-layer configuration of the user equipment, a PC5 QoS flow is no longer sent to the opposite-end user equipment, data is no longer sent to a source identifier and target identifier, a PC5 QoS flow is no longer sent to the source identifier and target identifier, the data as for a sidelink unicast identifier is no longer sent, a PC5 QoS flow is no longer sent as for a sidelink unicast identifier, or sending is not performed on a frequency point.

In one embodiment, the sending module is configured such that the sidelink user equipment information does not include at least one of the following: the second target data no longer sent or the frequency point of the second target data no longer sent. The second target data includes the data no longer sent to an opposite-end user equipment, a PC5 QoS flow no longer sent to the opposite-end user equipment, data no longer sent to a source identifier and target identifier, a PC5 QoS flow no longer sent to the source identifier and target identifier, the data as for a sidelink unicast identifier no longer sent, or a PC5 QoS flow no longer sent as for a sidelink unicast identifier.

In one embodiment, the occasion determination module is configured to, when the layer 2 identifier of an opposite-end user equipment is obtained, trigger the sidelink user equipment information to be sent to indicate requesting a sidelink unicast communication sending resource. In one embodiment, in the occasion determination module, the sidelink user equipment information includes at least one of the following: a target layer 2 identifier of unicast communication; a unicast communication type; a source layer 2 identifier and a target layer 2 identifier of unicast communication; a sidelink interface signaling radio bearer or a sidelink interface radio resource control signaling indication; a sidelink unicast identifier; or the PC5 QoS flow information in a sidelink unicast identifier, in a target layer 2 identifier of unicast communication, or in a source layer 2 identifier and a target layer 2 identifier of unicast communication.

In one embodiment, in the occasion determination module, the sidelink user equipment information includes at least one of the following: a target layer 2 identifier of unicast communication; a unicast communication type; a source layer 2 identifier and a target layer 2 identifier of unicast communication; a sidelink unicast identifier; or a sidelink interface signaling radio bearer or a sidelink interface radio resource control signaling indication. Correspondingly, it includes the following.

In the case where the capability interaction of user equipments is completed or the sidelink interface radio resource control connection is established completely, the sidelink user equipment information, including the PC5 QoS flow information in a sidelink unicast identifier, in a target layer 2 identifier of unicast communication, or in a source layer 2 identifier and a target layer 2 identifier of unicast communication, is sent.

In one embodiment, the PC5 QoS flow information includes a PC5 QoS flow identifier, a PC5 QoS parameter, or a PC5 QoS configuration profile.

In one embodiment, the apparatus further includes a receiving module configured to receive the sidelink bearer configuration information sent by the base station. The sidelink bearer configuration information sent by the base station includes a sidelink unicast identifier associated with a sidelink bearer or a target layer 2 identifier index associated with a sidelink bearer. The target layer 2 identifier index associated with a sidelink bearer is an index number serialized based on the entry sequence of the target layer 2 identifier in the sidelink user information.

The present application further provides a user equipment. The user equipment includes processors and a storage apparatus configured to store programs. When executed by the processors, the programs cause the processors to perform the sidelink communication resource request method according to the present application.

The present application further provides a storage medium. The storage medium stores a computer program which, when executed by a processor, causes the processor to the sidelink communication resource request method according to the present application.

What is claimed is:

1. A data transmission method, applied to a first communication node, comprising:
   determining remapping configuration information, wherein the remapping configuration information indicates a PC5 quality of service (QOS) flow in which re-mapping occurs, a source sidelink radio bearer (SLRB) corresponding to the PC5 QoS flow in which re-mapping occurs and a target SLRB corresponding to the PC5 QoS flow in which re-mapping occurs; and
   sending the remapping configuration information to a second communication node;
   wherein the data transmission method further comprises:
   sending SLRB configuration information to the second communication node;
   wherein the SLRB configuration information comprises at least one of: a reordering timer parameter, an out-of-order delivery indication, a reassembly timer parameter, or a status prohibition timer parameter.

2. The data transmission method according to claim 1, further comprising: receiving configuration information sent by a base station, wherein the configuration information comprises a modified mapping relationship between an SLRB and PC5 QoS flows; or the configuration information comprises identifier information of the PC5 QoS flow in which re-mapping occurs, identifier information of the source SLRB, and identifier information of the target SLRB.

3. The data transmission method according to claim 2, wherein the modified mapping relationship between the SLRB and the PC5 QoS flows comprises at least one of the following:
   at least one PC5 QoS flow being deleted from the existing PC5 QoS flows that are mapped to the SLRB, a mapping relationship between a new SLRB and PC5 QoS flows being added, or at least one new PC5 QoS flow mapped to the SLRB being added in the existing mapping relationship between the SLRB and the PC5 QoS flows.

4. The data transmission method according to claim 1, wherein the sending the remapping configuration information to the second communication node comprises:
   sending the remapping configuration information to the second communication node through a sidelink radio resource control message; or sending the remapping configuration information to the second communication node through a sidelink media access control-control element.

5. The data transmission method according to claim 1, further comprising:
   in a case where data on the source SLRB and of the PC5 QoS flow in which re-mapping occurs is transmitted completely, sending, on the source SLRB, an end marker to the second communication node, wherein the end marker indicates that the data on the source SLRB and of the PC5 QoS flow in which re-mapping occurs is transmitted completely.

6. The data transmission method according to claim 5, wherein the end marker comprises a control-type Service Data Adaptation Protocol protocol data unit, and the Service Data Adaptation Protocol protocol data unit comprises a control-type indication of the Service Data Adaptation Protocol protocol data unit and a PC5 QoS flow identifier, or the Service Data Adaptation Protocol protocol data unit comprises the control-type indication of the Service Data Adaptation Protocol protocol data unit.

7. The data transmission method according to claim 1, wherein the SLRB configuration information comprises a mapping relationship between an SLRB and PC5 QoS flows.

8. The data transmission method according to claim 1, further comprising:
   receiving SLRB configuration information sent by a base station, wherein the SLRB configuration information sent by the base station comprises a sidelink unicast identifier associated with an SLRB or a target layer 2 identifier index associated with an SLRB, wherein the target layer 2 identifier index associated with the SLRB is an index number serialized based on an entry sequence of a target layer 2 identifier in sidelink user information.

9. A data transmission method, applied to a second communication node, comprising:
  receiving remapping configuration information sent by a first communication node;
  determining a PC5 quality of service (QOS) flow in which re-mapping occurs, a source SLRB, and a target SLRB based on the remapping configuration information; and
  in a case where data on the source SLRB and of the PC5 QoS flow in which re-mapping occurs is transmitted completely, transmitting data on the target SLRB and of the PC5 QoS flow in which re-mapping occurs;
  wherein the data transmission method further comprises:
  receiving SLRB configuration information sent by the first communication node;
  wherein the SLRB configuration information comprises at least one of: a reordering timer parameter, an out-of-order delivery indication, a reassembly timer parameter, or a status prohibition timer parameter.

10. The data transmission method according to claim 9, wherein the remapping configuration information comprises a modified mapping relationship between an SLRB and PC5 QoS flows.

11. The data transmission method according to claim 10, wherein the modified mapping relationship between the SLRB and the PC5 QoS flows comprises at least one of the following:
  at least one PC5 QoS flow being deleted from the existing PC5 QOS flows that are mapped to the SLRB, a mapping relationship between a new SLRB and PC5 QoS flows being added, or at least one new PC5 QoS flow mapped to the SLRB being added in the existing mapping relationship between the SLRB and the PC5 QoS flows.

12. The data transmission method according to claim 9, wherein a completion of a transmission of the data on the source SLRB and of the PC5 QoS flow in which re-mapping occurs comprises:
  receiving an end marker sent by the first communication node, wherein the end marker indicates that the data on the source SLRB and of the PC5 QoS flow in which re-mapping occurs is transmitted completely.

13. The data transmission method according to claim 9, before the data on the source SLRB and of the PC5 QoS flow in which re-mapping occurs is transmitted completely, further comprising:
  in a case where the data on the target SLRB and of the PC5 QoS flow in which re-mapping occurs is received, buffering, on a Packet Data Convergence Protocol receiving buffer or a Service Data Adaptation Protocol receiving buffer, the data on the target SLRB and of the PC5 QoS flow and not transmitting the data to an upper layer.

14. A first communication node, comprising:
  processors; and
  a storage apparatus configured to store programs,
  wherein the programs are executed by the processors so that the processors perform the following:
  determining remapping configuration information, wherein the remapping configuration information indicates a PC5 quality of service (QOS) flow in which re-mapping occurs, a source sidelink radio bearer (SLRB) corresponding to the PC5 QoS flow in which re-mapping occurs and a target SLRB corresponding to the PC5 QoS flow in which re-mapping occurs; and
  sending the remapping configuration information to a second communication node;
  wherein the processors further perform:
  sending SLRB configuration information to the second communication node;
  wherein the SLRB configuration information comprises at least one of: a reordering timer parameter, an out-of-order delivery indication, a reassembly timer parameter, or a status prohibition timer parameter.

15. A second communication node, comprising:
  processors; and
  a storage apparatus configured to store programs,
  wherein the programs are executed by the processors so that the processors perform the data transmission method according to claim 9.

16. A non-transitory storage medium for storing a computer program which, when executed by a processor, causes the processor to perform the data transmission method according to claim 1.

17. The first communication node according to claim 14, wherein the processors are configured to further perform:
  receiving configuration information sent by a base station, wherein the configuration information comprises a modified mapping relationship between an SLRB and PC5 QoS flows; or the configuration information comprises identifier information of the PC5 QoS flow in which re-mapping occurs, identifier information of the source SLRB, and identifier information of the target SLRB.

18. The first communication node according to claim 17, wherein the modified mapping relationship between the SLRB and the PC5 QoS flows comprises at least one of the following:
  at least one PC5 QoS flow being deleted from the existing PC5 QoS flows that are mapped to the SLRB, a mapping relationship between a new SLRB and PC5 QoS flows being added, or at least one new PC5 QoS flow mapped to the SLRB being added in the existing mapping relationship between the SLRB and the PC5 QoS flows.

19. The first communication node according to claim 14, wherein the processors are configured to perform sending the remapping configuration information to the second communication node in the following manner:
  sending the remapping configuration information to the second communication node through a sidelink radio resource control message; or
  sending the remapping configuration information to the second communication node through a sidelink media access control-control element.

20. The first communication node according to claim 14, wherein the processors are configured to further perform:
  in a case where data on the source SLRB and of the PC5 QoS flow in which re-mapping occurs is transmitted completely, sending, on the source SLRB, an end marker to the second communication node, wherein the end marker indicates that the data on the source SLRB and of the PC5 QOS flow in which re-mapping occurs is transmitted completely.

* * * * *